(12) United States Patent
Burdick

(10) Patent No.: US 7,119,551 B2
(45) Date of Patent: Oct. 10, 2006

(54) CAPACITIVE SENSOR

(75) Inventor: Kenneth J. Burdick, Skaneateles, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 0 days.

(21) Appl. No.: 11/250,348

(22) Filed: Oct. 14, 2005

(65) Prior Publication Data

US 2006/0049835 A1    Mar. 9, 2006

Related U.S. Application Data

(63) Continuation of application No. 11/005,731, filed on Dec. 6, 2004, now Pat. No. 6,992,492, which is a continuation of application No. 10/058,191, filed on Oct. 26, 2001, now Pat. No. 6,828,801.

(51) Int. Cl.
G01R 27/26  (2006.01)
H03B 5/08  (2006.01)

(52) U.S. Cl. .................... 324/658; 324/681; 331/36 C; 331/65

(58) Field of Classification Search ................. 324/658
See application file for complete search history.

(56) References Cited

U.S. PATENT DOCUMENTS 4,679,032 A * 7/1987 Roschier ..................... 340/562
4,806,783 A * 2/1989 Anderson .................... 73/724
4,920,322 A * 4/1990 Ruijs ........................... 331/17
4,987,389 A * 1/1991 Brosh et al. .................. 331/65
5,136,262 A * 8/1992 Spencer ....................... 324/681
5,929,677 A * 7/1999 Murata ......................... 331/17

* cited by examiner

Primary Examiner—Vincent Q. Nguyen
Assistant Examiner—Timothy J. Dole
(74) Attorney, Agent, or Firm—Wall Marjama & Bilinski LLP

(57) ABSTRACT

An improved two loop capacitive sensor oscillator circuit converts a transducer capacitance to a frequency and includes a first loop to create an oscillatory waveform having a frequency related to a capacitance of the capacitive transducer. The first loop includes a resistor. The resistor is electrically coupled to a capacitor. The resistor is also electrically coupled to the capacitive transducer. The capacitive transducer is electrically coupled to an input of a first inverter gate. A second loop oscillates at the frequency of the first loop and further generates a second waveform of a substantially square wave shape at the same frequency. The second loop is electrically coupled to the first loop and the output of a third inverter gate is substantially a square wave at the frequency related to the capacitance of the capacitive transducer.

40 Claims, 7 Drawing Sheets

CAPACITIVE SENSOR

CROSS-REFERENCE TO RELATED APPLICATIONS

The present application is a continuation of U.S. patent application Ser. No. 11/005,731, filed on Dec. 6, 2004 now U.S. Pat. No. 6,992,492 which is a continuation application of U.S. patent application Ser. No. 10/058,191, filed Oct. 26, 2001 (now issued as U.S. Pat. No. 6,828,801), entitled "Capacitive Sensor". The priorities of all of the above applications are claimed and the Ser. Nos. 10/058,191 and the 11/005,731 applications are incorporated herein by reference in their entirety.

BACKGROUND OF THE INVENTION

1. Field of the Invention

The present invention relates generally to fluid pressure sensors, and particularly to capacitive fluid pressure sensors.

2. Technical Background

Capacitive sensors are used widely in a variety of medical and industrial applications to measure linear parameters such as force and pressure. For example, capacitive pressure sensors are used in blood pressure products. They can also be used to measure air or other fluid pressures.

In the conventional approach, the capacitive pressure sensor includes a pressure sensor assembly coupled to an electronic circuit. The pressure sensor assembly includes a port that connects the sensor to the environment. The sensor itself is constructed using a variable capacitor. In this design, one plate of the variable capacitor is formed by attaching a metal plate to a diaphragm. A fixed plate is held at a distance using spacer elements, that are fixed or adjustable. There are several problems with the conventional approach.

Fabrication is difficult and expensive. The variable capacitor is not an off-the-shelf component. The use of a metal plate attached to a diaphragm introduces measurement errors if the planar surface of the attached plate is not parallel to the planar surface of the fixed plate. Further, the attached metal plate has a relatively large mass. This substantially increases the sensor's susceptibility to errors caused by vibration, acceleration, and the sensor's orientation to the earth's gravitational field.

The electronic circuit used in the conventional approach employs a three-inverter oscillator circuit that converts the capacitance of the capacitive transducer to a square wave. The frequency of the square wave is easily measured by a microprocessor, or by some other means. FIG. 1 is an electrical schematic of a conventional three-inverter oscillator circuit. The circuit includes three inverter gates G1, G2, and G3. Typically, each gate includes protection diodes. The biggest problem with the circuit depicted in FIG. 1 is the conduction of the input protection diodes of the threshold detector stage G1. In order to mitigate the effects of the diode conduction, the conventional design employs resistor R3. Depending on its value, R3 either reduces or eliminates the diode conduction. However, as R3 reduces diode errors, it amplifies errors introduced by other components in the oscillator. The direct effect is increased sensitivity to changes in capacitance of the internal circuit at the input of gate G1, thus affecting frequency stability. The group delay of the low-pass filter created by R3 and the input capacitance of G1 causes the sensitivity to most other errors in the sensor to be increased. The ideal situation is where no delays are added to the signal path. The introduction of R3 also changes the effective threshold voltage ($V_{th}$) of gate G1. The conventional design has other problems as well. The circuit board that is used to support the electronics and the means used to support the plates of the variable capacitor C1 include dielectric material that contributes to inter-plate capacitance between the nodes of the circuit, especially between plates of the capacitor C1. Because the dielectric constant of the circuit board supports varies with temperature, the conventional sensor is sensitive to changes in temperature.

What is needed is a compact, inexpensive capacitive sensor that is easily fabricated using commonly available components. A sensor is needed that is not susceptible to errors caused by vibration, acceleration, and sensor orientation to the earth's gravitational field. A sensor is needed that includes an improved oscillator circuit that reduces the effects of diode conduction, including drift over temperature, without the errors introduced by the conventional design.

SUMMARY OF THE INVENTION

According to one aspect of the invention, an improved two loop capacitive sensor oscillator circuit to convert a transducer capacitance to frequency comprises a first loop to create an oscillatory waveform having a frequency related to a capacitance of the capacitive transducer. The first loop includes a resistor having a resistor first connection and a resistor second connection. The resistor second connection is electrically coupled to a capacitor (Cs1), having a capacitor (Cs1) first connection and a capacitor (Cs1) second connection. The resistor second connection is electrically coupled to the capacitor (Cs1) first connection and the capacitor (Cs1) second connection is electrically coupled to an electrical common. The resistor second connection is also electrically coupled to the capacitive transducer, the capacitive transducer having a capacitive transducer first connection and a capacitive transducer second connection. The resistor second connection is electrically coupled to the capacitive transducer first connection. The capacitive transducer second connection is electrically coupled to an input of a first inverter gate also having a first inverter gate output. The first inverter gate output is electrically coupled to a second inverter gate input, the second inverter gate also having a second inverter gate output, and the second inverter gate output is electrically coupled to the resistor first connection, closing the first loop. The first and second inverter gates are powered by a source of power (Vcc). A second loop oscillates at the frequency of the first loop and further generates a second waveform of a substantially square wave shape having the same frequency. The second loop is electrically coupled to the first loop, the second loop including an input to the second loop being the input of a third inverter gate also having a third inverter gate output. The third inverter gate input is electrically coupled to the second inverter gate output, the third inverter gate output electrically coupled to a second loop resistor first connection. The second loop resistor also has a second loop resistor second connection, the second loop resistor second connection electrically coupled to the input of the first inverter gate, closing the second loop. The third inverter gate is also powered by the source of power (Vcc), wherein the second loop is electrically coupled to the first loop and the output of the third inverter gate is the substantially square wave at the frequency related to the capacitance of the capacitive transducer.

DETAILED DESCRIPTION OF THE PREFERRED EMBODIMENTS

Figure 1:
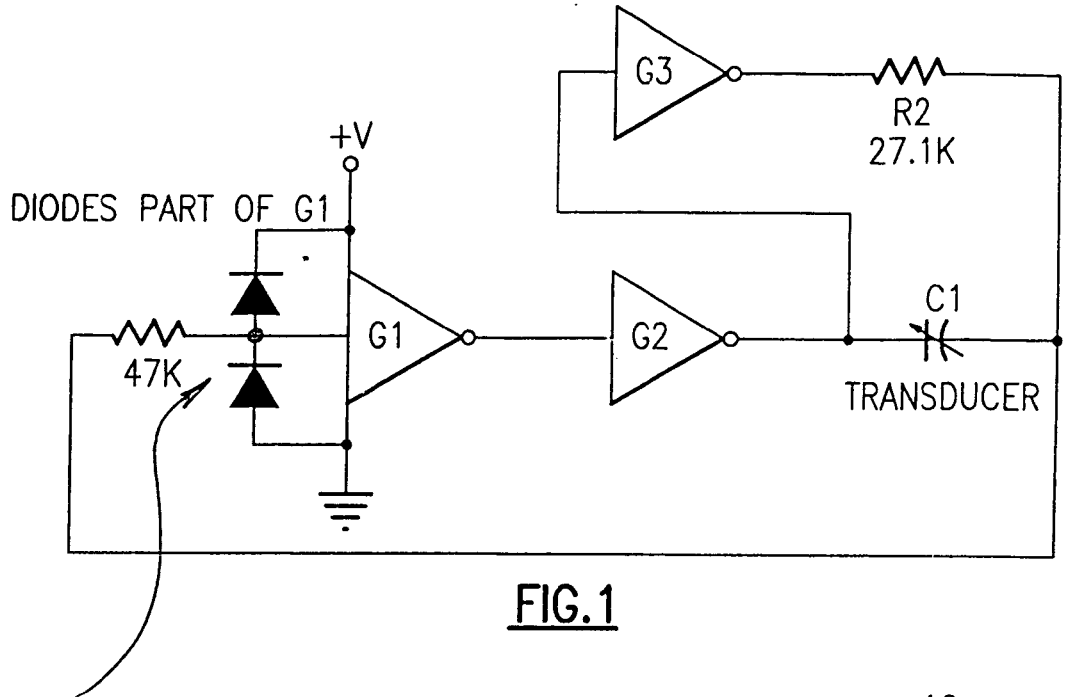
FIG. 1 is a schematic of a conventional three-inverter oscillator circuit.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the capacitive sensor of the present invention is shown in FIG. 2, and is designated generally throughout by reference numeral 10.

In accordance with the invention, the present invention for a capacitive sensor includes a variable capacitor transducer that is adapted to vary its capacitance in accordance with a change in an environmental parameter. The present invention is adapted to measure any linear parameter such as force or pressure. In one embodiment, the variable capacitor transducer of the present invention is formed by juxtaposing a metallic diaphragm to a conductor layer disposed on a circuit board, to thereby provide a sensor that is compact, inexpensive to make, and easily fabricated using commonly available components. Furthermore, it is less susceptible to errors caused by vibration, acceleration, and its orientation to the earth's gravitational field. Finally, the output of the capacitive sensor does not substantially drift with changes in temperature.

Figure 2:
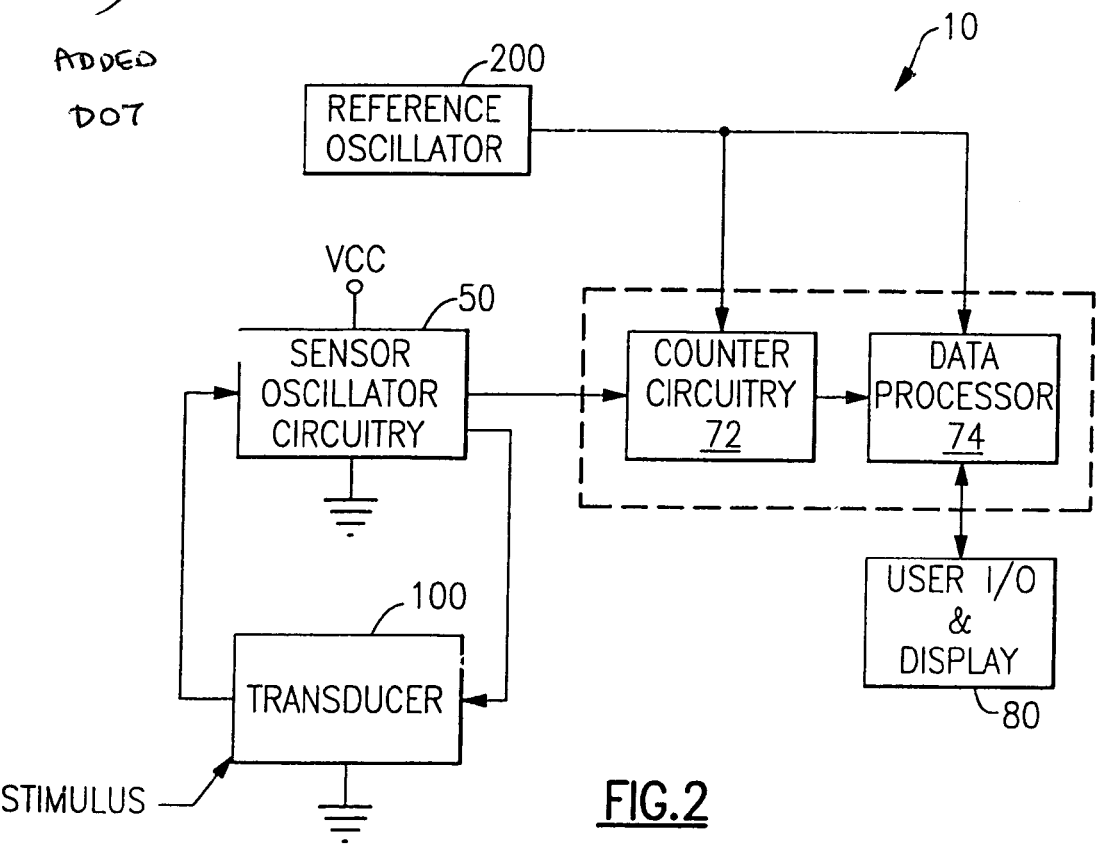
FIG. 2 is a block diagram of the capacitive pressure sensor in accordance with the present invention.

As embodied herein and depicted in FIG. 2, a block diagram of capacitive pressure sensor 10 in accordance with the present invention is disclosed. Sensor 10 includes capacitive pressure sensor transducer 100 connected to oscillator circuit 50. Measurement and Processing circuit 70 is connected to the output of oscillator circuit 50. Measurement/Processing circuit 70 includes counter circuit 72 connected to data processor 74. Both counter circuit 72 and data processor 74 are connected to reference oscillator 200. Processor 74 is also connected to user I/O unit 80.

Capacitive pressure sensor transducer 100 is discussed below in the text associated with FIG. 3, FIG. 4, and FIG. 5. Various embodiments of oscillator circuit 50 are discussed below in the text associated with FIG. 6, FIG. 7, FIG. 8, and FIG. 9. Various embodiments of counter circuit 72 are discussed below in the text associated with FIG. 10, FIG. 11, and FIG. 12. It will be apparent to those of ordinary skill in the pertinent art that data processing unit 74 may be of any suitable type, depending on a variety of factors, including component reliability and cost, but there is shown by way of example a microprocessor. In an alternate embodiment, data processor 70 is implemented using an application specific IC (ASIC). In another alternate embodiment, data processor 74 is implemented using a digital signal processor. User I/O unit 80 includes a keypad and a display.

Essentially, sensor 10 operates as follows. The dynamic portion of transducer 100 is a variable capacitor. As the measured environmental parameter changes, the capacitance changes. Oscillator 50 converts the capacitance into an AC signal. Counter 72 measures the frequency of the AC signal. Processor 74 converts the measured frequency into the parameter (pressure, force, etc.) measurement. The measure parameter is displayed on unit 80.

Figure 3:
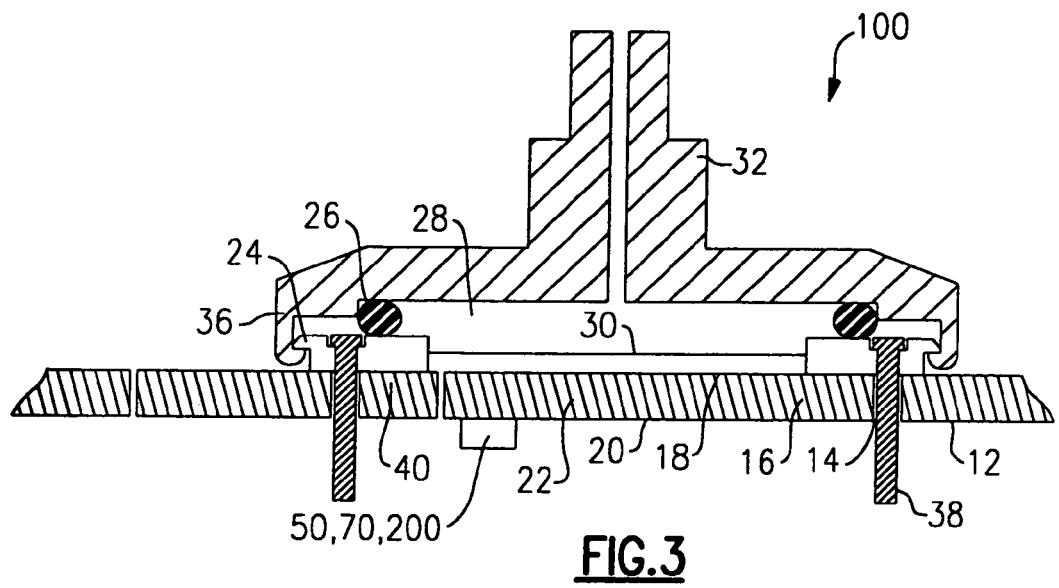
FIG. 3 is a cross-sectional view of the capacitive pressure sensor transducer in accordance with the present invention.

As embodied herein, and depicted in FIG. 3, a cross-sectional view of capacitive pressure sensor 10 in accordance with the present invention is disclosed. Sensor 10 includes metallic conductor layer 18 formed on a surface of circuit board 12. Ground conductor layer 20 is disposed on the opposite surface of circuit board 12. Circuit board 12 also includes dielectric material 22, disposed between conductor layer 18 and ground layer 20. Metal ring 24 is connected to circuit board 12 by pins 38, which are inserted through ring conductor 14. Metal ring 24 receives structural support from support plate 40, which is disposed between circuit board 12 and metal ring 24. Support plate 40 causes conductor layer 18 and the support plane of metal ring 24 to be co-planar, to thereby reduce mechanical tolerance stack-up. Metallic diaphragm 30 is coupled to circuit board 12 by being sandwiched between metal ring 24 and O-ring 26. Thus, metallic diaphragm 30 is disposed over circuit board 12 and juxtaposed to conductor layer 18 to form a variable capacitor. This design feature also has the effect of reducing mechanical tolerance stack-up. Metallic diaphragm 30 is held in place by O-ring 26. O-ring 26 is pressed against metallic diaphragm 30 and metal ring 24 by snap-on cap 32. Snap-on cap 32 includes multiple snaps 36 which fit over the edge of metal ring 24. In the embodiment depicted in FIG. 3, the electronics (oscillator 50, measurement and processor circuit 70, and reference oscillator 200) of sensor 10 are coupled to the underside of circuit board 12.

Ring conductor 14, guard rings 16, conductor layer 18, and ground layer 20 may be fabricated using any suitable material, but in the example depicted in FIG. 3, a copper material is used. Metal ring 24 may be fabricated using any suitable material including copper or aluminum based materials. Metallic diaphragm 30 may be fabricated using any suitable type of metallic material, such as silicon, a ceramic material having a metallic layer on the surface, or a copper based foil material, such as beryllium copper.

It will be apparent to one of ordinary skill in the art that transducer 100 includes several salient features and advantages. For example, disposing conductor layer 18 on circuit board 12 to form the stationary plate of the variable capacitor reduces the size, complexity and number of parts in the design. It is also noted that ground layer 20, metallic diaphragm 30, metal ring 24, and guard rings 16 form an enclosure that substantially isolates conductor layer 18 from electrical interference. The enclosure also isolates conductor layer 18 from changes in the capacitance caused by movement of nearby people and objects.

Another salient feature of the invention involves snap-on cap 32. As discussed above, snap-on cap 32 holds metallic diaphragm 30 against metal ring 24 with O-ring 26. This mechanical system symmetrically loads the sealing pressure on metal ring 24, to seal pressure measurement cavity 28 while holding metallic diaphragm 30 firmly in place. Because of the symmetric loading, forces that could warp transducer assembly 100 are substantially reduced. Snap-on cap 32 also allows transducer assembly 100 to be disassembled for servicing and recycling.

Yet another salient feature of the present invention involves metallic diaphragm 30. As discussed above, metallic diaphragm 30 of the present invention is comprised of a metal foil. As it is moved by the fluid pressure toward conductor layer 18, it assumes a curved shape, approximating a section of a sphere. This feature substantially reduces the sensor's sensitivity to errors caused by capacitive plates that are not parallel to each other. The use of the diaphragm rather than an attached plate has other advantages as well. Using the conductive surface of the diaphragm instead of the attached plate substantially reduces the mass of the movable portion of the variable capacitor. Because of the reduced mass, the sensor's measurement errors due to acceleration, changes in orientation with respect to the earth's gravitational field, and vibration are substantially minimized.

Yet another salient feature of the present invention includes the disposition of ground conductor layer 20 and guard rings 16 in circuit board 12, between conductor layer 18 and those conductors connected in common with ring conductor 14. This feature minimizes the contribution of dielectric material 22 to inter-plate capacitance C1. The significance of this is that the performance of the sensor does not vary with temperature induced changes in the dielectric constant of dielectric material 22 in circuit board 12.

In an alternate embodiment of the invention, ground conductor layer 20 is disposed within circuit board 12, instead of being disposed on the surface of circuit board 12. Again, ground conductor layer 20, metallic diaphragm 30, metal ring 24, and guard rings 16 form an enclosure that substantially isolates conductor layer 18 from electrical interference. As discussed above, this enclosure also isolates conductor layer 18 from changes in capacitance caused by movement of nearby people and objects. However, by placing ground conductor layer 20 within circuit board 12, the electrical components (50, 70, 200) of sensor 10 can be disposed on the underside of circuit board 12 coupled to ground conductor layer 20. Thus, a stand-alone sensor module is created, ideally suited for industrial or automotive applications.

Figure 4:
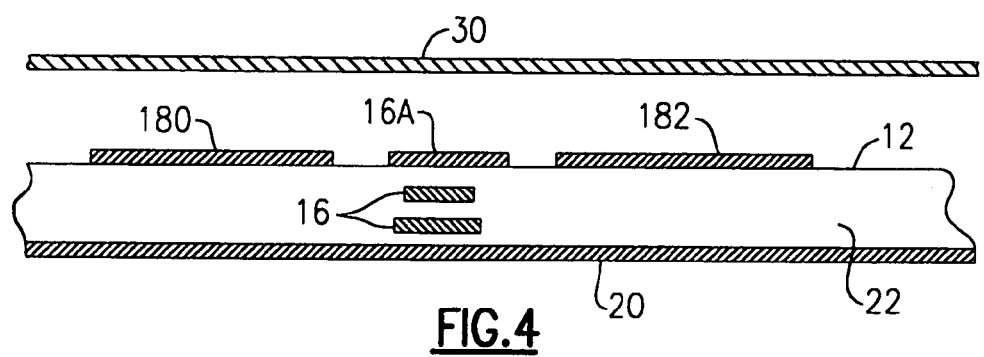
FIG. 4 is a cross-sectional view of an electrode configuration in the capacitive pressure sensor transducer in accordance with a second embodiment of the present invention.

As embodied herein and depicted in FIG. 4, a cross-sectional view of an electrode configuration in capacitive pressure sensor transducer 100 in accordance with a second embodiment of the present invention is disclosed. Printed circuit board 12 is used as the substrate. Circuit board 12 is fabricated using dielectric material 22. Ground layer 20 is disposed on the under-side of circuit board 12. Ground rings 16 are disposed within dielectric mater 22. Outer electrode 180 and inner electrode 182 are co-planar, enclosing ground conductor 16A within the plane of the top-side of circuit board 12. Metallic diaphragm 30 is a ground third electrode in capacitive sensor transducer 100. FIG. 5 is a plan view of the electrode configuration depicted in FIG. 4. As shown, electrode 180 and electrode 182 are arranged in a spiral, serpentine, and/or interdigitated pattern to maximize inter-electrode capacitance. As shown by the "footprint" of diaphragm 30, diaphragm 30 covers the entire area of the co-planar electrode pattern. In the embodiment shown in FIG. 4 and FIG. 5, the mechanical arrangement of capacitive transducer 100 is identical to the one shown in FIG. 3.

Figure 5:
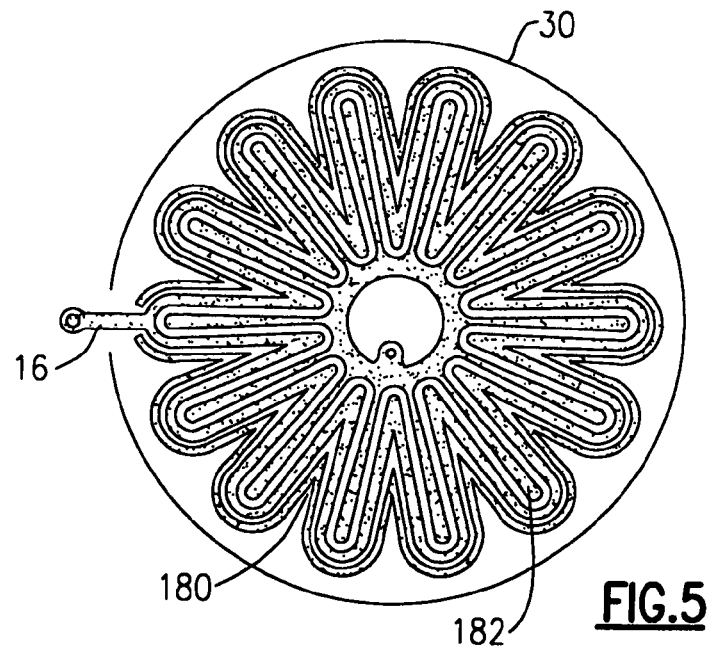
FIG. 5 is plan view of the electrode configuration depicted in FIG. 4.

The benefit of the electrode configuration shown in FIG. 4 and FIG. 5 is as follows. In standard capacitive pressure sensors, both of the capacitor plate electrodes of the sensing capacitor are un-grounded. As a result, they may propagate AC signals because they act as small antennae radiating AC signals into space. When a metal diaphragm is used, it is more than likely to be electrically connected to one of the plates of the sensor capacitor. Thus, it will also propagate AC signals. Depending on circuit details, the AC signals propagated by the plates may include high-frequency signals that are transmitted by the plates resulting in electromagnetic interference. There are other sources of error, as well. The capacitance of the plates can also be influenced by their proximity to nearby objects. The capacitance plates can serve as antennae carrying external electromagnetic interference into the circuit. Each of these scenarios result in measurement errors. Therefore it becomes necessary to add shielding around the sensor plates to mitigate these effects. Shielding is expensive. The above described electrode configuration substantially mitigates these problems by grounding one of the sensor electrodes, to thereby shield the active electrodes at a very low cost.

As shown, coplanar electrodes 180 and 182 are arranged on the top surface of a substrate forming a capacitor with a substantial amount of its capacitance coming from the electric fields above the plane and some of its capacitance coming from the field passing through circuit board 12. Electrodes 180 and 182 are connected to the circuits that convert the capacitance to a more readily measured quantity, such as frequency or voltage. Metallic diaphragm 30 is a grounded electrode that propagates essentially no AC signal. Diaphragm 30 is arranged so that it moves with respect to electrode 180 and electrode 182 in a direction normal to their plane. As diaphragm 30 moves closer to the plane of electrodes 180 and 182, it cuts into the electric field above them, reducing the capacitance between the first two. As shown in FIG. 5, diaphragm 30 is large enough to cover most or all of the area of electrode 180 and electrode 182, maximizing the desired change in capacitance.

To minimize substrate capacitance between electrodes 180 and 182, grounded conducting layer 20 is located in a plane directly below them. In one embodiment, it is on the lower surface of circuit board 12 (as shown in FIG. 4). In another embodiment, grounded conducting layer 20 is embedded within dielectric material 22. Ground electrode 16A is also coplanar with electrodes 180 and 182, being disposed between electrode 180 and electrode 182. Ground electrode 16A serves to reduce the inter-electrode substrate capacitance.

Grounded diaphragm 30 and grounded conducting layer 20 functions as shielding for electrode 180 and electrode 182. Additional shielding can be added until a complete enclosure is formed around electrode 180 and electrode 182. This may be added by extending diaphragm 30 or using other conductive members that are fixed in relation to electrode 180 and electrode 182. The term "grounded" as used herein, means grounded in the AC sense, and need not be directly connected to circuit ground.

Figure 6:
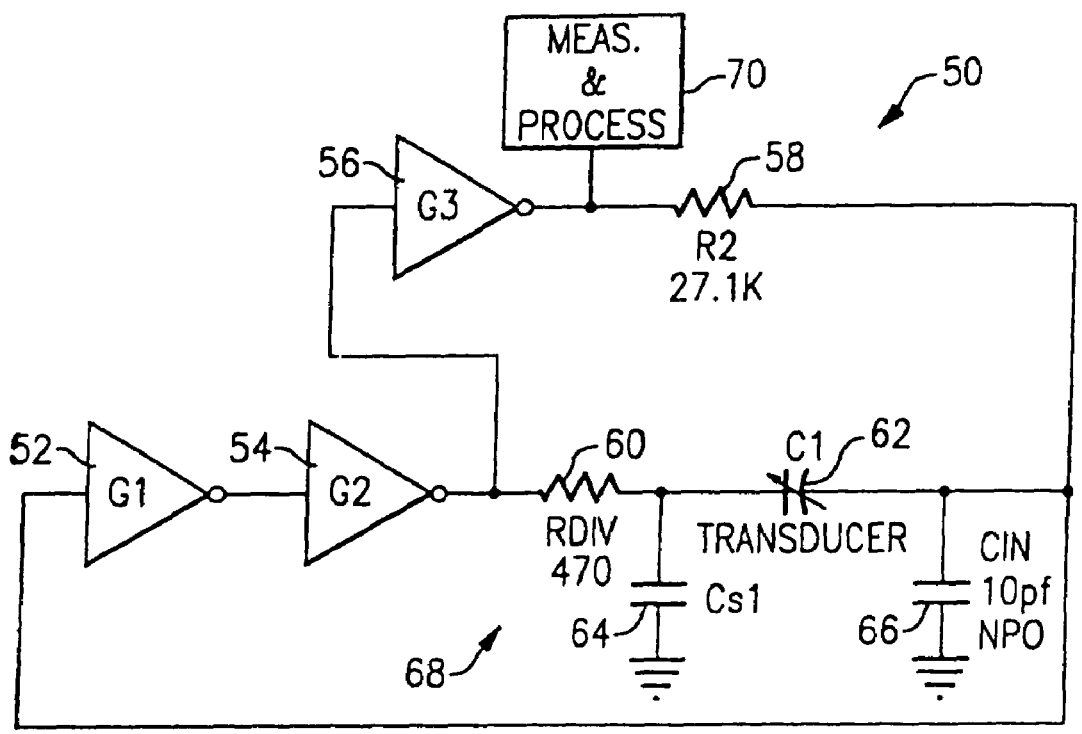
FIG. 6 is a schematic of an improved three-inverter oscillator circuit in accordance with the present invention.

As embodied herein and depicted in FIG. 6, a schematic of oscillator circuit 50 in accordance with the present invention is disclosed. Although oscillator circuit 50 is configured to operate with pressure sensor 10 depicted in FIG. 2, it must be emphasized that oscillator circuit 50 can be used with any type of capacitive sensor. Oscillator circuit 50 includes a first loop having inverter gate 52, inverter gate 54, resistor 60, and capacitive transducer 62 in series. Optional capacitor 66 is connected between the input of inverter 52 and ground. Optional capacitor 64 is connected between the output of resistor 60 and ground. Capacitor 64 and Capacitor 66 are in parallel with stray capacitances that result from the construction of the sensor 10 and the proximity of the oscillator 50 on the circuit board 12 to the ground conductor. Low-pass filter 68 is formed by series resistor 60 in combination with capacitor 64, capacitor 66 and the stray capacitances discussed above. Capacitors forming low-pass filter 68 can be separate components, e.g., capacitor 64 and capacitor 66, or stray capacitances resulting from intentional design choices in the construction of sensor 10 and location of components on the circuit board 12. Oscillator circuit 50 also includes a second loop in parallel with resistor 60 and capacitive transducer 62. The second loop includes inverter gate 56 in series with resistor 58. The output of oscillator circuit 50 is connected to frequency measurement and processing unit 70.

Oscillator circuit 50 is a type of RC relaxation oscillator. The dynamic portion of oscillator circuit 50 is capacitance transducer 62. When power is applied, transducer 62 begins charging up to $V_{cc}$, in accordance with the equation $v(t)=V_{cc}(1-\exp[-t/RC])$. The speed of the response of this circuit is determined by the time constant RC. That is, in one time constant, $v(t)$ builds up to 63.2% of $V_{cc}$. However, when $v(t)$ reaches the inverter threshold voltage $V_{th}$, the polarity of inverter gates 52, 54, and 56 is reversed, and the voltage $v(t)$ is driven to $3V_{cc}/2$. At this point, transducer 62 begins to discharge toward ground, in accordance with the equation $v(t)=(3/2)V_{cc}\exp[-t/RC]$. In one time-constant RC, the voltage across capacitor transducer 62 decays to 36.8% of $(3/2)V_{cc}$. However, when $v(t)$ reaches the inverter threshold voltage $V_{th}$, the polarity of inverter gates 52, 54, and 56 is reversed again. The voltage $v(t)$ is driven to $-V_{cc}/2$ and transducer 62 begins charging up to $V_{cc}$ to begin the cycle anew. In this way, the voltage across capacitor transducer 62 produces a saw-tooth shaped waveform.

Inverter gates 52, 54, and 56 alternate between $V_{cc}$ and ground. For example, if the input voltage to inverter gate 56 is below $V_{th}$, the output of inverter gate 56 will be driven to $V_{cc}$. If the input voltage to inverter gate 56 is above $V_{th}$, the output of inverter gate 56 is grounded. Thus, the output waveform provided by oscillator circuit 50 is a square wave having a frequency inversely proportional to time constant RC. In a nutshell, a change in the parameter being measured produces a change in the capacitance of transducer 62. A change in the capacitance of transducer 62 produces a change in the frequency of the square wave produced by oscillator circuit 50. The frequency of the square wave can easily be measured by frequency measurement and processing unit 70. It will be apparent to those of ordinary skill in the art that gate 52 and gate 54 can be replaced by a single non-inverting gate. It will also be apparent to those of ordinary skill in the art that gate 52 can be replaced by an analog comparator.

It will be apparent to one of ordinary skill in the art that oscillator circuit 50 includes several salient features and advantages. The addition of resistor 60 has the salutary effect of limiting the effects of threshold voltage changes. In one embodiment, resistor 60 is implemented as a part of gate G2. Another salient feature of oscillator circuit 50 includes resistor 60 in combination with capacitor 64. This combination virtually eliminates diode conduction at the zero crossing detector input while substantially reducing the errors introduced by R3 in the conventional design (as discussed above). Capacitor 64 is, in actuality, a combination of various capacitances. Some of which are formed by ring conductor 14 and guard rings 16. As discussed above, the combination of resistor 60 and capacitor 64 also forms low pass filter 68, which substantially reduces RF interference. Yet another salient feature of oscillator circuit 50 is the optional employment of capacitor 66. Capacitor 66 reduces the sensitivity to changes in other parameters in sensor 10. For example, capacitor 66 forms a capacitor divider when combined with the inter-plate capacitance of circuit board 12 (FIG. 2) to substantially reduce diode conduction at the zero-crossing detector input.

Figure 7:
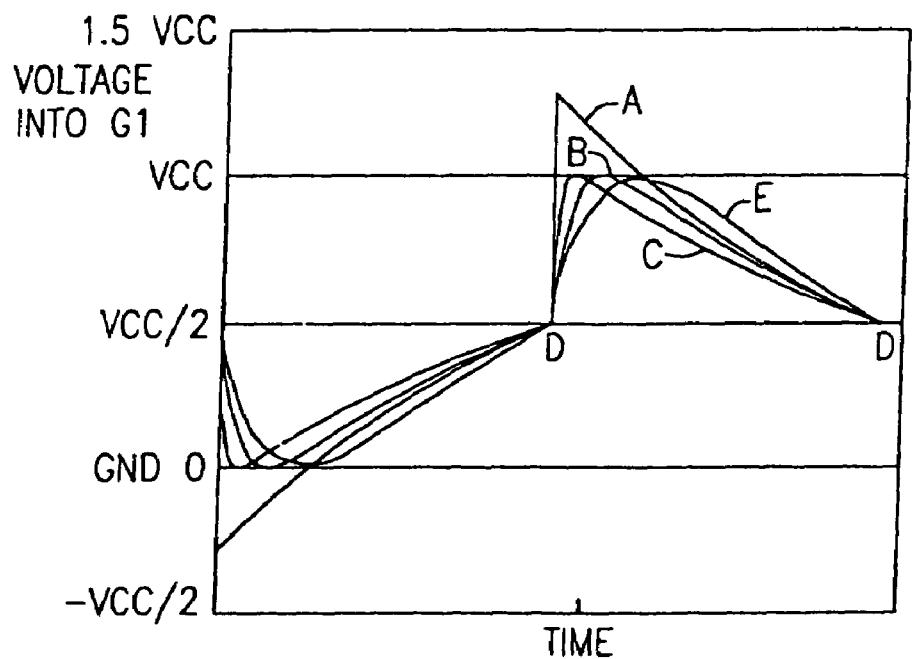
FIG. 7 is a chart showing voltage waveform comparisons between the traditional oscillator circuit shown in FIG. 1 and the three-inverter oscillator circuit depicted in FIG. 6.

FIG. 7 is a chart comparing the waveforms present at the input of gate G1 for the standard oscillator circuit shown in FIG. 1 to the oscillator circuit of the present invention. Waveform A illustrates the performance of the standard oscillator circuit depicted in FIG. 1. As discussed above, the oscillator circuit depicted in FIG. 1 does not include a low-pass filter. When there is no filter, the voltage waveform present at the input of gate G1 is driven beyond VCC and ground. This causes the input protection diodes of G1 to conduct. Waveform E shows the standard circuit depicted in FIG. 1 with the value of resistor R3 being increased to prevent diode conduction by forming a low pass filter at the input of gate G1. The slope of approach to Point-D is improved, but significant group delay is added, and gain errors are introduced. The sensitivity to changes in the internal input capacitance of gate G1 is also significantly increased.

Waveform B illustrates the advantages of adding low-pass filter 68 to oscillator circuit 50 depicted in FIG. 6. The voltage present at the input of gate G1 does not exceed VCC or ground. Diode conduction is eliminated. On the other hand, the slope of the approach to VCC/2 at Point D is somewhat reduced compared to the non-filtered waveform-A, slightly amplifying the noise and offset drift errors of G1. Also some group delay is added, as evidenced by shifting of the waveform to the right. The addition of delay has the harmful effect of amplifying errors caused by drift in other components. Filter 68 has the additional advantage of removing high frequency components in the voltage present on the plates of transducer 62. Thus, filter 68 substantially reduces or eliminates the need for additional shielding to prevent unwanted emissions of radio frequency energy from diaphragm 30 and conductive layer 18.

Waveform C illustrates the advantages of adding a stable capacitance (such as an NPO type ceramic capacitor) to capacitance 66 in FIG. 6. Adding capacitor 66 in combination with transducer capacitance 62 forms voltage divider. Series capacitance 62 of the transducer works with capacitor 66 to reduce the voltage presented to the input of gate G1. The effects of the voltage divider are illustrated in FIG. 7 by waveform-C. The slope of the approach to VCC/2 at point D is lower than for waveform A or waveform B with the harmful effect that sensitivity to changes in the threshold voltage and noise of gate G1 is increased. However, the addition of a stable capacitance (such as an NPO type ceramic capacitor) to capacitance 66 reduces the sensitivity of the sensor oscillator frequency to capacitance changes due to changes in the circuit board dielectric 22. At the same time, the group delay is significantly less than for waveform "B", with the attendant benefit. Thus, an engineering tradeoff can be made between the sources of error as the amount of voltage divider effect and of low-pass filter effect are varied.

Figure 8:
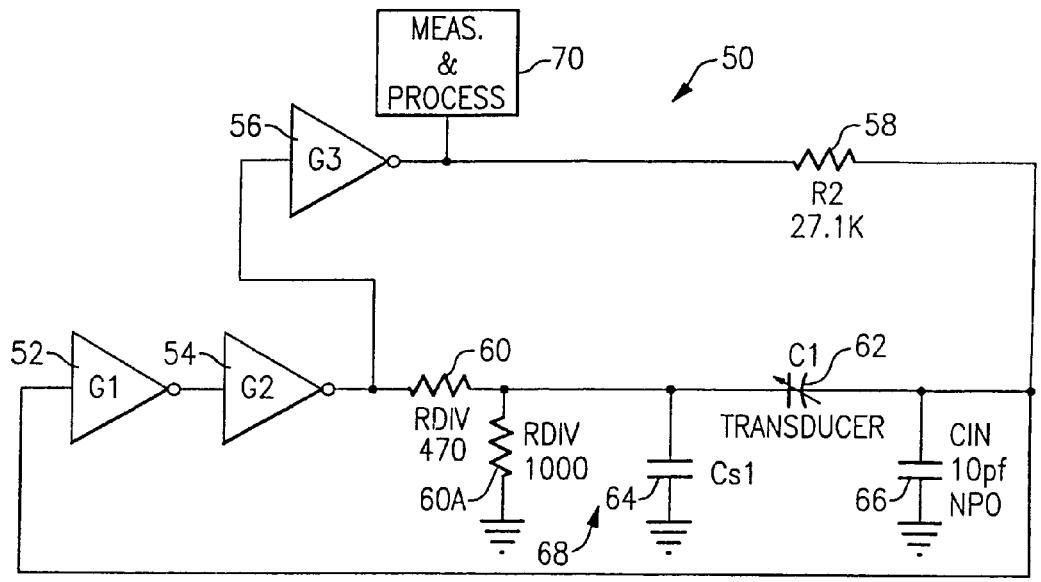
FIG. 8 is a schematic of an improved three-inverter oscillator circuit in accordance with a third embodiment the present invention.

As embodied herein and depicted FIG. 8, a schematic of an improved three-inverter oscillator circuit in accordance with a second embodiment the present invention is disclosed. This embodiment is identical to the embodiment depicted in FIG. 6, except that resistor 60A is placed in series with resistor 60 to form voltage divider 74. Voltage divider 74 functions in much the same way as capacitive voltage divider 68. Thus, the voltage waveform present at the input of gate 52 is very similar to waveform-C shown in FIG. 7 except that divider 74 results in a smaller group delay, and a smaller slope of approach to Point-D. However, it has the disadvantages of consuming more power and introducing other sources of error. One such error is caused by variations in the output impedance of gate 54. Gain errors are caused by changes in the ratio of resistor 60 to resistor 60A. However, the implementation of a gain correction method (discussed below) will be effective in reducing these effects on gain accuracy.

Figure 9:
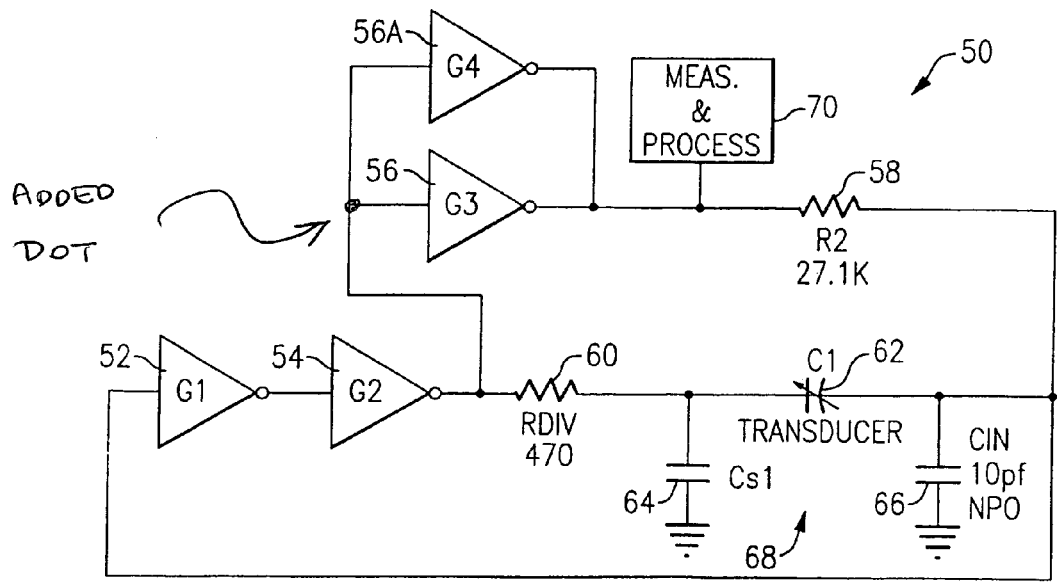
FIG. 9 is a schematic of an improved three-inverter oscillator circuit in accordance with a fourth embodiment the present invention.

FIG. 9 is a schematic of an improved three-inverter oscillator circuit in accordance with a third embodiment the present invention. This embodiment is identical to the embodiment depicted in FIG. 6, except that gate 56A is disposed in parallel with gate 56. In similar embodiments, gate 56A includes a plurality of gates in parallel with gate 56. Gate 56A functions to reduce the errors caused by changes in the output resistance of gate 56.

As shown in FIG. 6, FIG. 8, and FIG. 9, oscillator circuit 50 is connected to measurement/processing circuit 70, which includes counter 72. The method of counting the pulses from the oscillator is not important as long as it can measure the frequency with adequate resolution. The most straightforward methods are Frequency Counting and Period Averaging.

Figure 10:
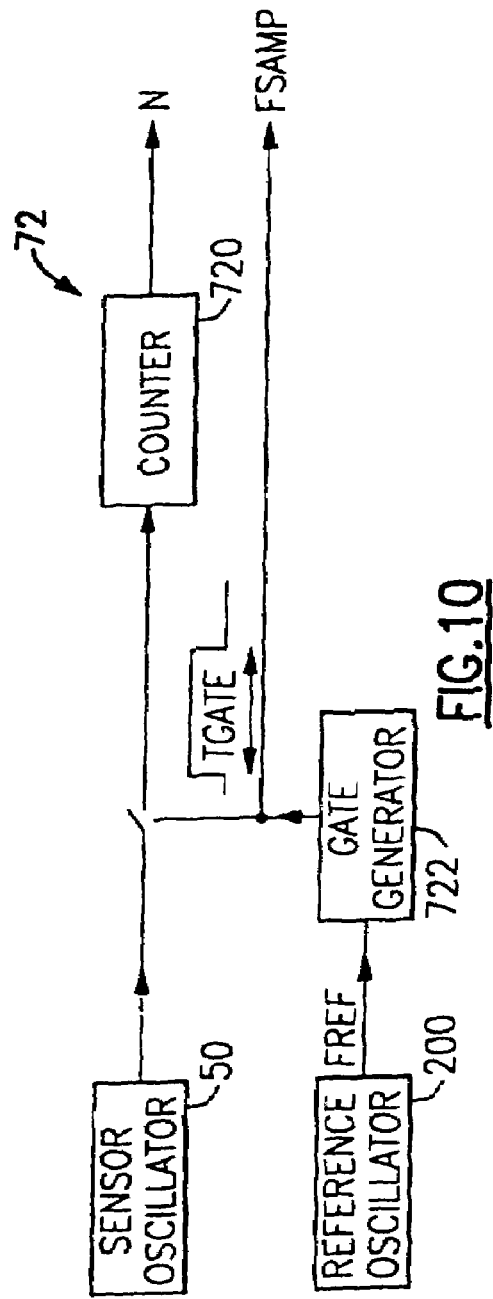
FIG. 10 is a block diagram of the counter circuit shown in FIG. 2 in accordance with a fifth embodiment the present invention.

As embodied herein and depicted in FIG. 10, a block diagram of counter circuit 72 in accordance with a fourth embodiment the present invention is disclosed. In this embodiment, the frequency counting method is employed. Counter circuit 72 includes pulse counter 720 and gate generator 722. Gate generator 722 provides counter 720 with an enablement pulse with width $T_{gate}$. The frequency counting method counts the pulses from sensor oscillator 50 during a fixed interval of time $T_{gate}$, yielding a number N. The frequency of the result is then $N/T_{gate}$. This is very simple and economical, but requires a long time to obtain a given resolution. This can be improved by increasing the frequency of operation of sensor oscillator 50, but at a cost of larger drift errors in sensor oscillator 50 as the delay of the gates becomes more dominant in determining the frequency.

Figure 11:
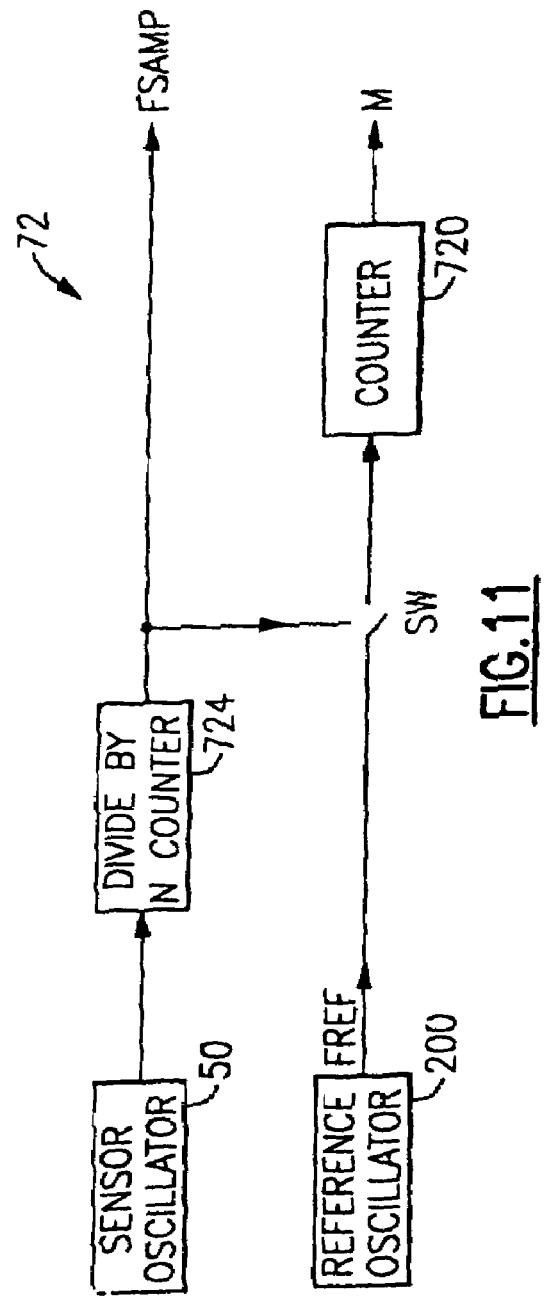
FIG. 11 is a block diagram of the counter circuit shown in FIG. 2 in accordance with a sixth embodiment the present invention.

As embodied herein and depicted in FIG. 11, a block diagram of counter circuit 72 in accordance with a fifth embodiment the present invention is disclosed. This embodiment employs the period averaging method. Circuit 72 includes counter 720 coupled to divide-by-N counter 724 via switch SW. Divide-by-N counter 724 is also connected to oscillator circuit 50. The period averaging method offers an improvement in resolution over the previous embodiment at a given measurement repetition rate. In the instant embodiment, the frequency of sensor oscillator 50 is divided in divide-by-N counter 724 by a large fixed number N to create a gate signal. During the gate signal, high frequency reference oscillator 200 provides signal $F_{ref}$, which is counted to determine the length of the gate, a number M. This number gives a measure of the period of N cycles of the oscillator. The frequency is the equal to the value: $f_0 = F_{ref}*N/M$. The standard method of period averaging takes measurements over variable intervals of time depending on the frequency from sensor 50. The most important limitation is that the value of N must be small enough so that the measurement never takes longer than the desired measurement interval. Margin must be left for variations in pressure and in component tolerances. As a result, the measurement may only be occurring during as little as about ⅔ of the available time. This results in an increase in noise in the measurement of about 23% above the theoretical minimum. It is noted that, noise is an important parameter for automatic blood pressure measurement.

Figure 12:
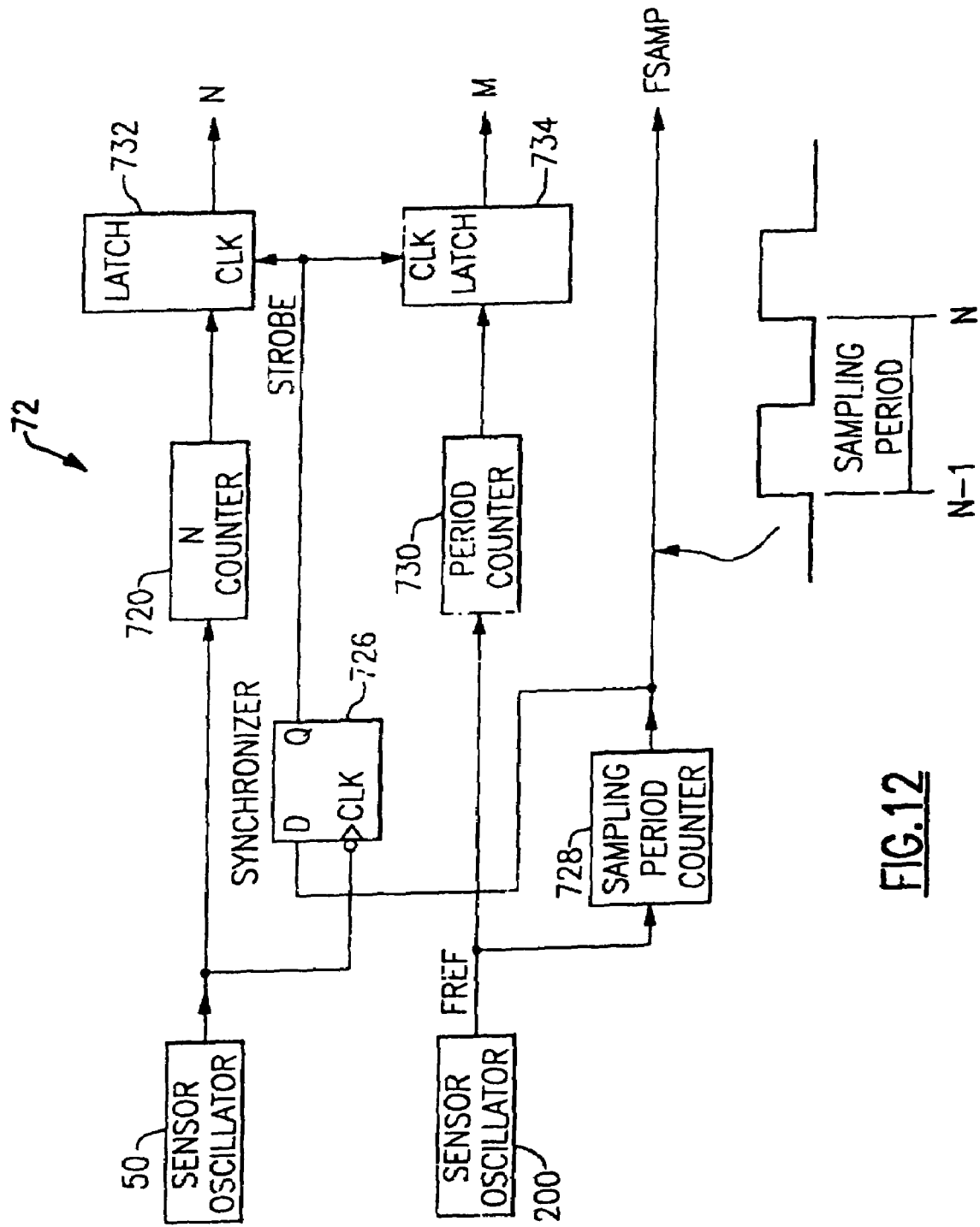
FIG. 12 is a block diagram of the counter circuit shown in FIG. 2 in accordance with a seventh embodiment the present invention.

As embodied herein and depicted in FIG. 12, a block diagram of counter circuit 72 in accordance with a sixth embodiment the present invention is disclosed. In this embodiment, circuit 72 uses a modified period averaging technique. Circuit 72 includes counter 720 connected to sensor oscillator 50 and latch 732. The frequency signal from sensor oscillator 50 is also used as the clock signal for D-flip-flop 726. The D-input is connected to the output of sampling period counter 728. The output Q of D-flip-flop 726 follows the value of $F_{samp}$ present during the falling edge of the clock signal. Reference oscillator 200 provides signal $F_{ref}$, which is the input signal to sampling period counter 728 and period counter 730. The output Q of D-flip-flop 726 is used to latch the output of counter 720 in latch 732, and it is used to latch that output of period counter 730 in latch 734. The output of latch 732 is value N, and the output of latch 734 is value M. This embodiment offers an improvement over the standard period averaging method. This method allows period averaging over 100% of the available time. The method counts the number of sensor 50 oscillator pulses N that begin within a given sampling period. This set of N pulses may take a slightly longer or slightly shorter time than the intended measurement interval, but such that the average time is exactly equal to the intended measurement interval (sampling period). The exact length of time taken by these pulses is determined by value M. The numbers are then divided to get the frequency of the sensor. In this method, the counters never stop counting. Instead, the values are sampled and latched at the appropriate moment to generate a series of data values. The value of N or M is then the difference in the latched values between the beginning of one interval and the beginning of the next interval. If the samples taken at the beginning of interval n are $N_n$ and $M_n$, and at the beginning of the previous interval are $N_{n-1}$ and $M_{n-1}$, then the frequency of the sensor oscillator is $$F_{sensor} = F_{ref} \frac{(N_n \ N_{n-1})}{(M_n \ M_{n-1})}.$$

Interrupt generator counter 728 creates the sampling frequency signal $F_{samp}$. D-type flip-flop 726 synchronizes this signal to sensor oscillator 50 to generate the Strobe signal. Additional flip-flops may be cascaded with 726 to improve metastability. The period of this Strobe matches the exact period of the N cycles of the sensor oscillator. Counter 720 counts the cycles of the sensor oscillator during the Strobe signal, and Period Counter 730 counts the length of the period of the Strobe signal.

The values of N and M are sent to data processor 74. Processor 74 performs the calculations. The Strobe signal is connected to processor 74 to alert it that new data is available in latch 732 and latch 734. One of ordinary skill in the art will recognize that counter 720, counter 728, counter 730, latch 732, and latch 734 may be of any suitable type depending on the components used in the design, but there is shown by way of example counter 720, counter 728, counter 730, latch 732, and latch 734 being implemented as discrete components. However, in an alternate embodiment, counter 720, counter 730, latch 732, and latch 734 are integrated in data processor 74. Data processor 74 is implemented using a microcontroller or digital signal processor.

An explanation of the offset method of error correction and the gain method of error correction follows. In many measurement applications, significant errors in measurement can be caused by environmental changes such as temperature or physical orientation, by other external sources such as deformations caused by physical shock (drop on the floor), and by aging of materials and components. All of these "drift" errors occur after the product is calibrated in the factory. Thus, before using sensor 10, it is necessary to calibrate it in the field. If the offset method (explained below) is used to correct for drift, then the frequency standard to which the sensor frequency is compared must be stable over time. If the gain correction method of drift correction is used, all long-term drift of the reference oscillator will be perfectly cancelled because $F_{ref}$ is a purely multiplicative term in the above equations. This allows the use of a lower cost frequency standard such as a ceramic resonator or an L-C oscillator.

One way of calibrating sensor 10 is by taking one or more sensor readings that allow the calibration of the sensor to be effected by mathematical means. The greater the number of readings, the greater the calibration accuracy. However, in many applications such as pressure measurement the cost of providing multiple known stimuli is prohibitively expensive. Thus, low-cost calibration is restricted to one measurement. Typically, the "zero-pressure" measurement is taken for a differential pressure measurement application because it is the lowest-cost option. However, with only one reference measurement available, there is no information about the characteristics of the error except for its magnitude. Thus the mathematical method of correction is by necessity, restricted to a simple one.

For most measurements, when a zero pressure reading is used, it is customary to assume that the error is in the form of an offset. Thus, an "offset correction" method is employed whereby the calculated error is subtracted from all subsequent measurements. In another embodiment, the reference measurement can be used to select from one of a series of curves or equations to model the error. The amount of correction is then determined by applying the selected curve or equation to the reading obtained from the unknown stimulus. In yet another embodiment, the calculated error is treated as a gain error that is corrected by multiplying subsequent readings by a correction factor.

When the offset method of correction is applied to a capacitive sensor, it does a good job of correcting for changes in the spacing d, but does poorly at correcting for changes in the area of the plates A and changes in the oscillator. This is because these changes are mostly changes in gain rather than offset. As a result, the gain errors are only partially compensated for, and the sensor will have span errors caused by these imperfections. To hold a given level of accuracy it is then necessary to incur extra expense to make the oscillator more stable. Similar errors occur when the offset method is applied to errors caused by voltage dividers. An example of this would be the voltage divider formed by resistance R3 in combination with the input capacitance of gate G1 in the conventional circuit in FIG. 1. Changes in attenuation cause the frequency of the relaxation oscillator to shift by essentially the same percentage for all frequencies of operation. Therefore, the amount of offset correction required varies with frequency, and it is not well corrected.

On the other hand, the gain correction method does an excellent job of correcting gain changes in the oscillator. With respect to FIG. 6, FIG. 8, and FIG. 9, errors can be induced by changes in resistances that work in combination with the sensor to determine operating frequency (e.g. resistor 58), variations in the performance of the voltage dividers, or by changes in threshold voltage at gate 52. Those skilled in the art will also recognize that stray capacitances to ground in oscillator 50 act primarily like voltage dividers, and are thus corrected by the method. Changes in delay of the oscillator are essentially uncorrected, but these can easily be kept small.

Figure 13:
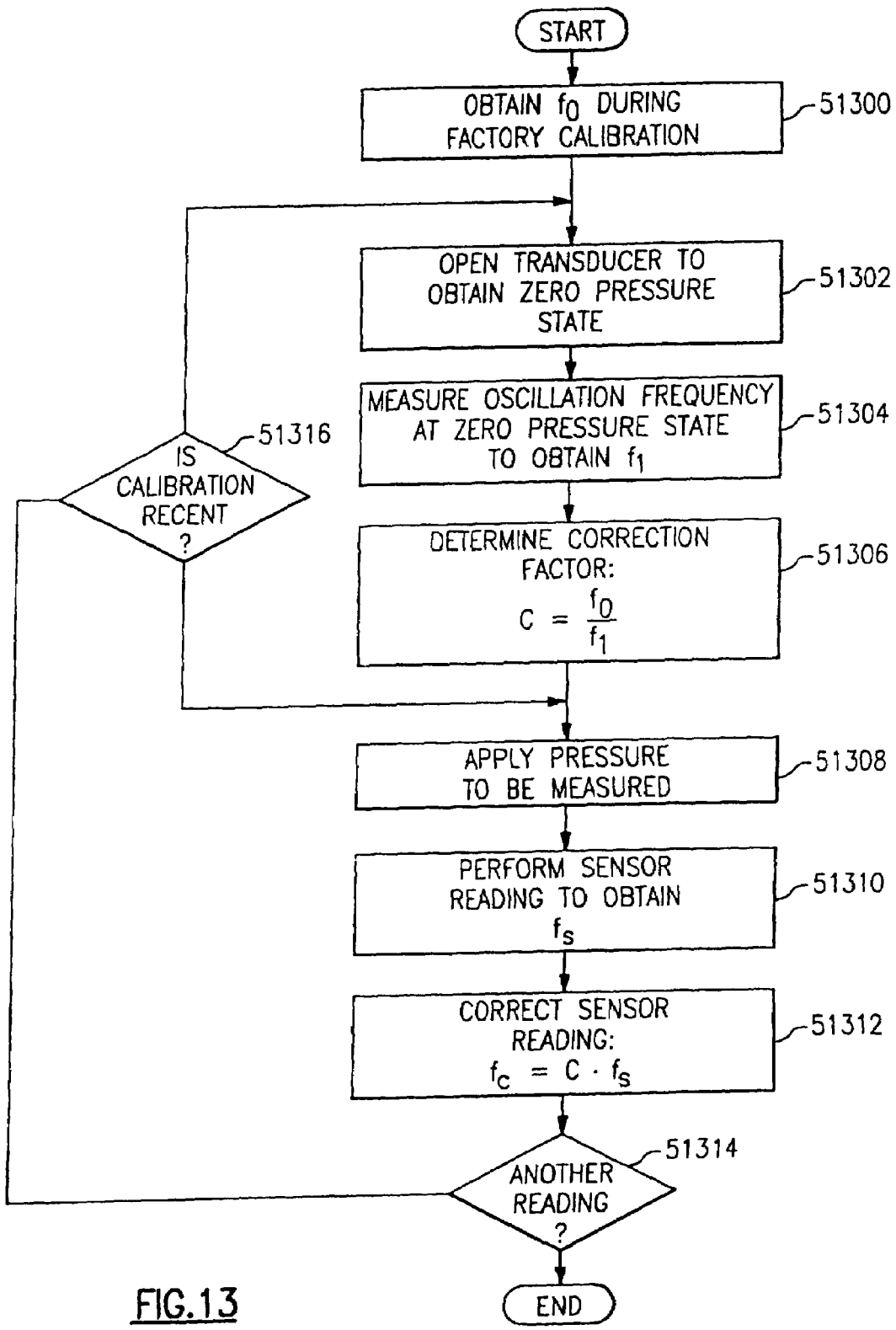
FIG. 13 is a flow chart showing a method for calibrating the present invention.
Figure 1:
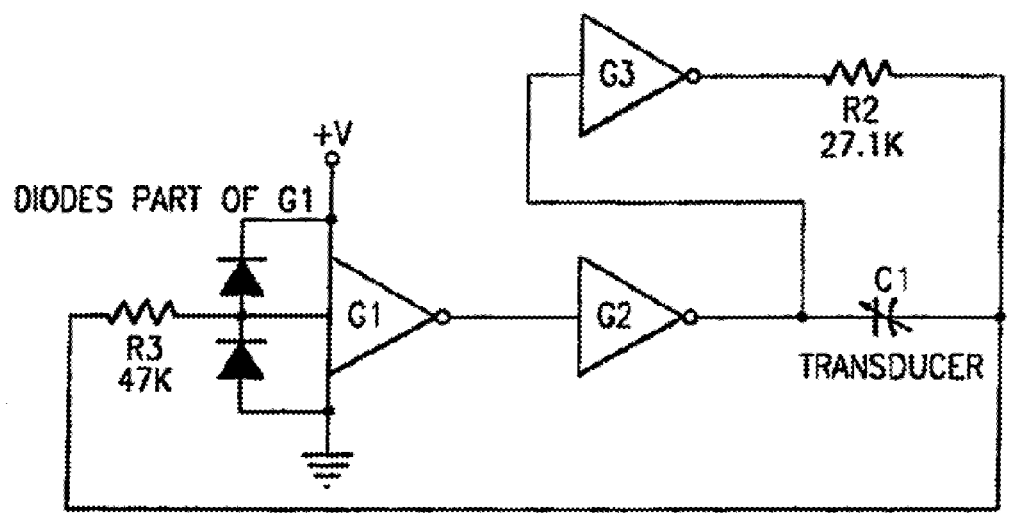
Figure 2:
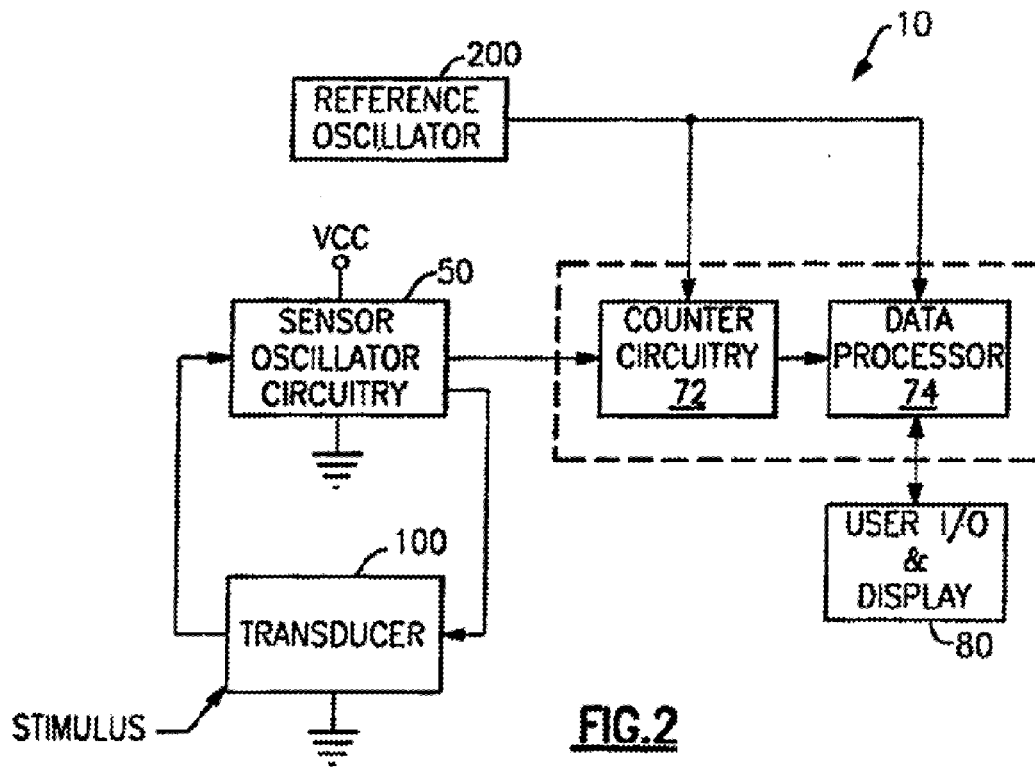
Figure 3:
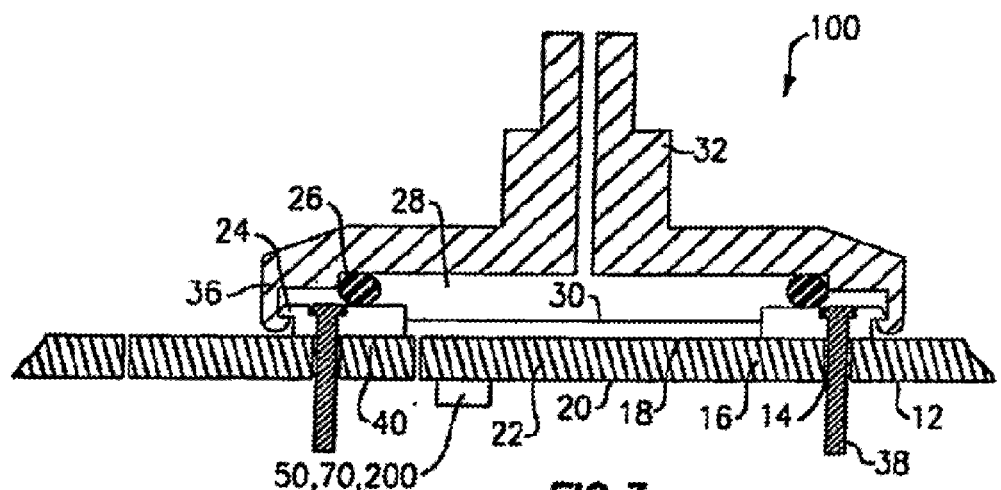
Figure 4:
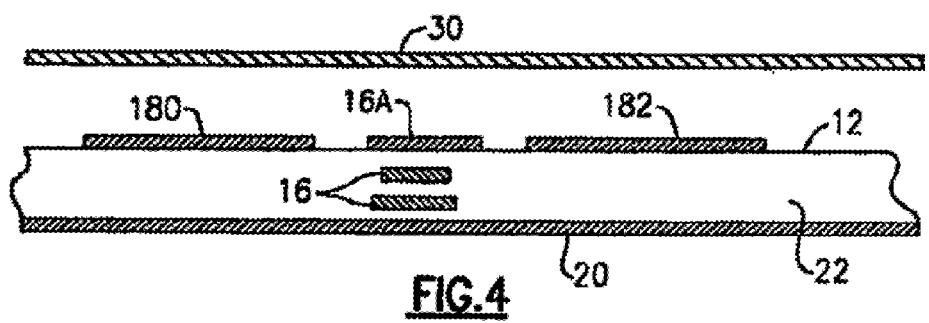
Figure 5:
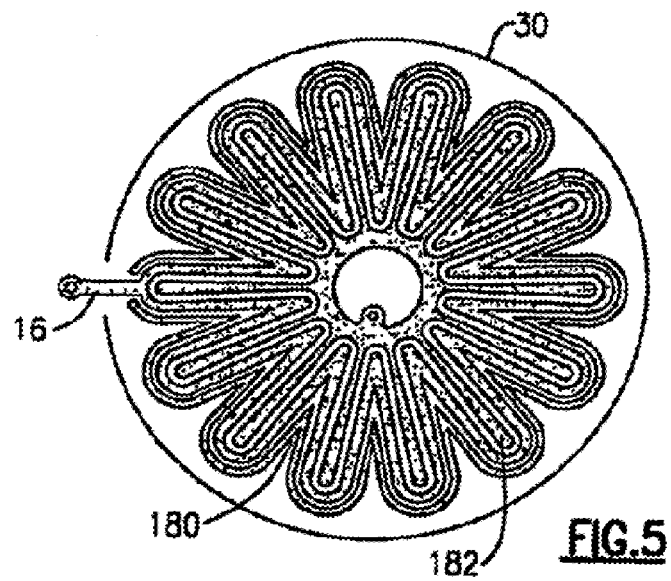
Figure 6:
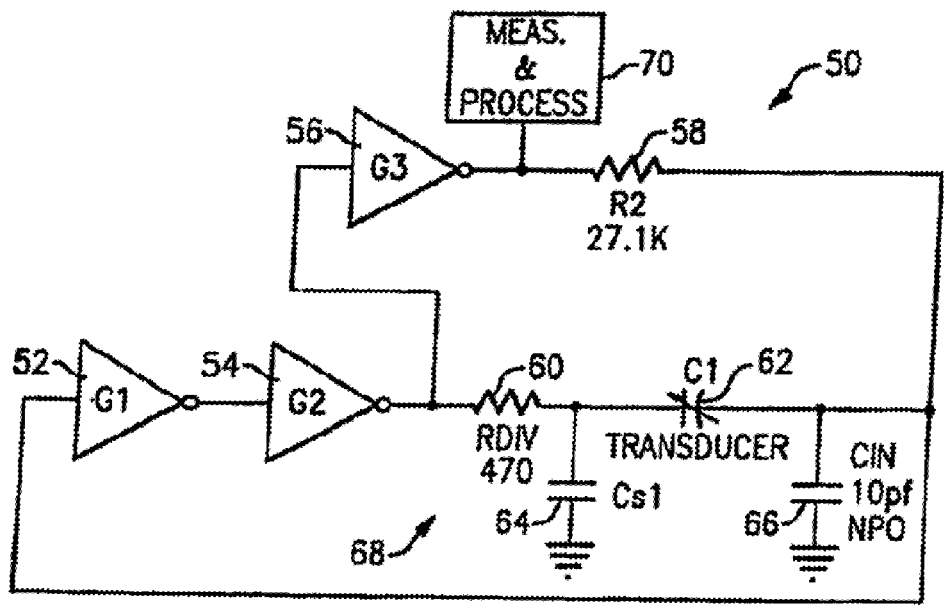
Figure 7:
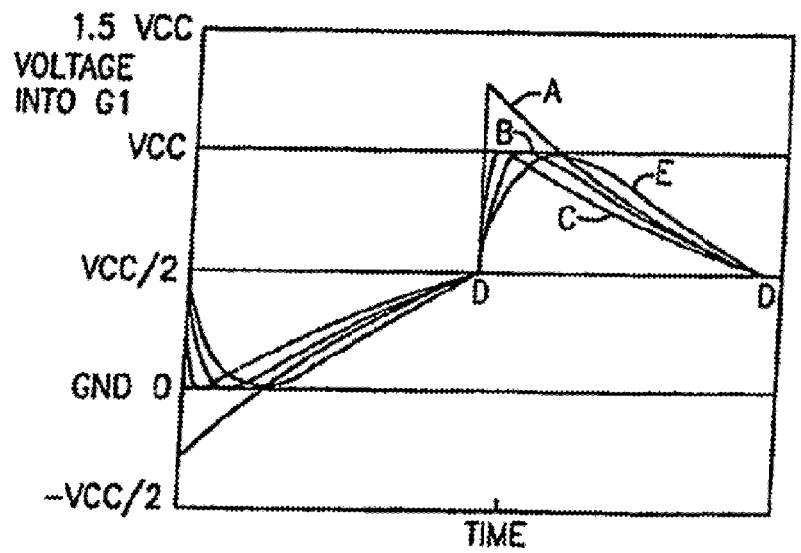
Figure 8:
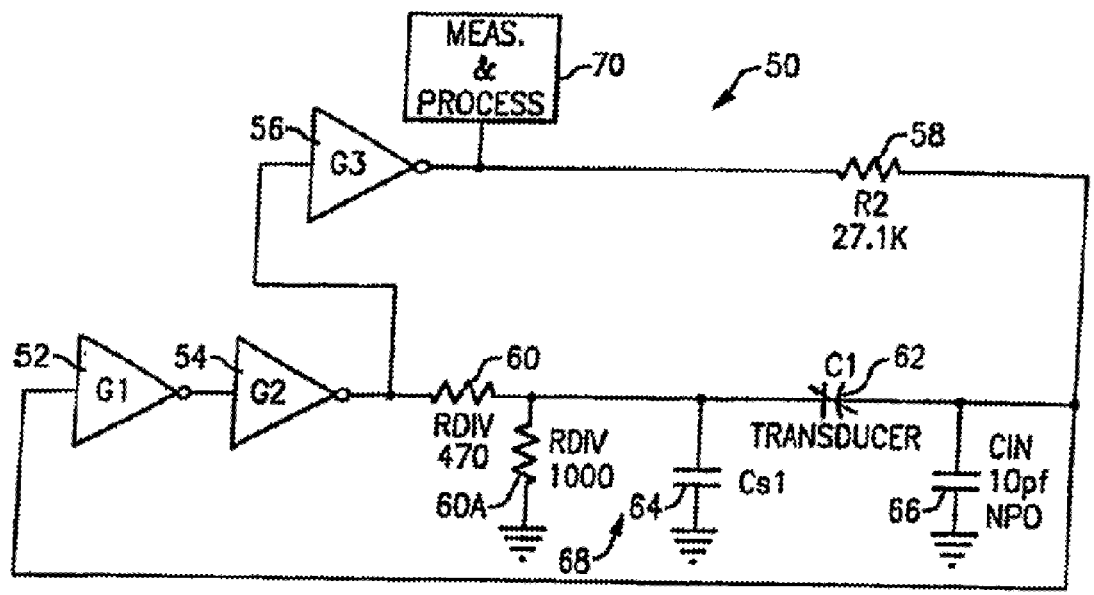
Figure 9:
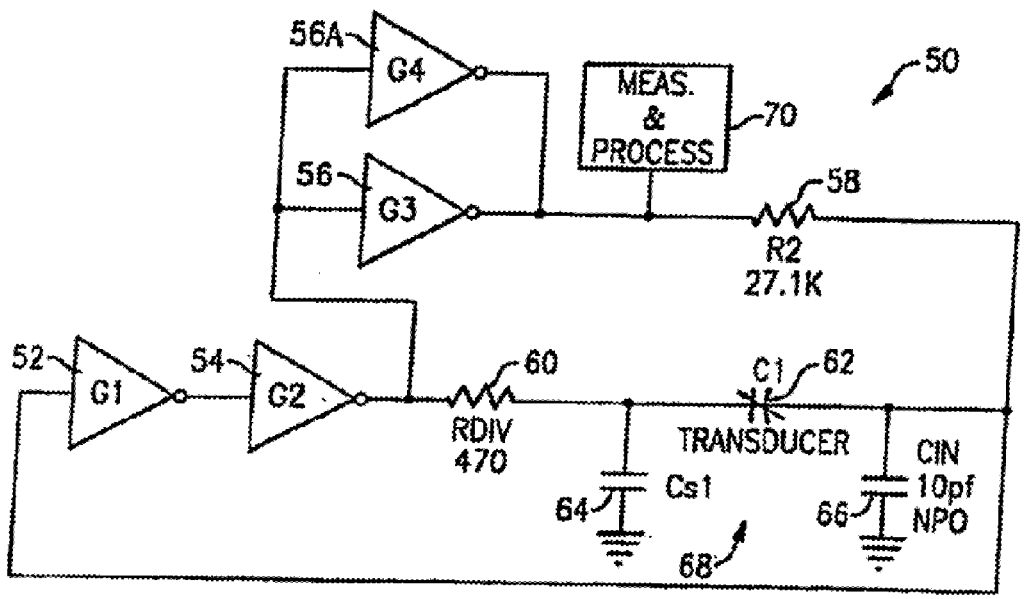
Figure 12:
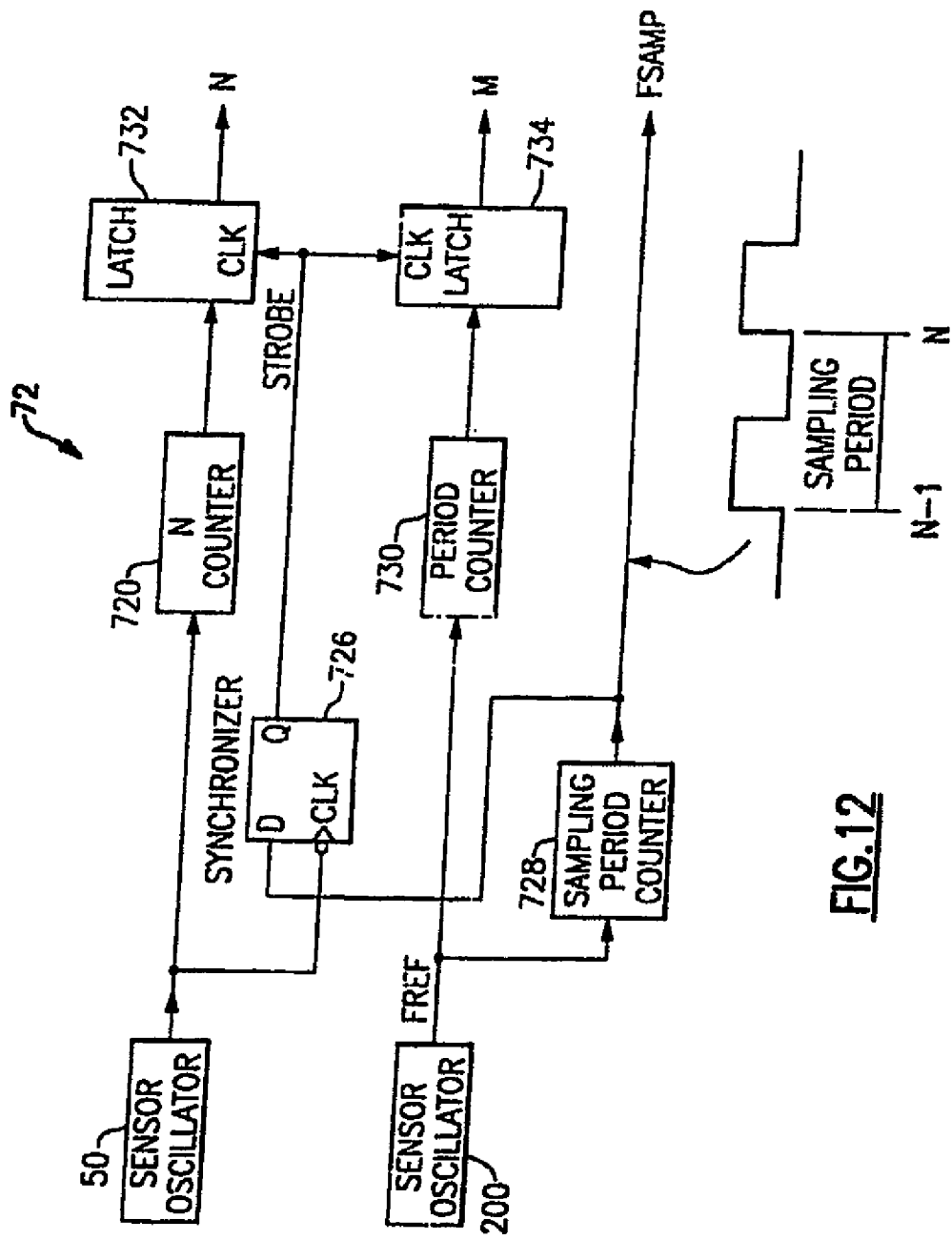
Figure 13:
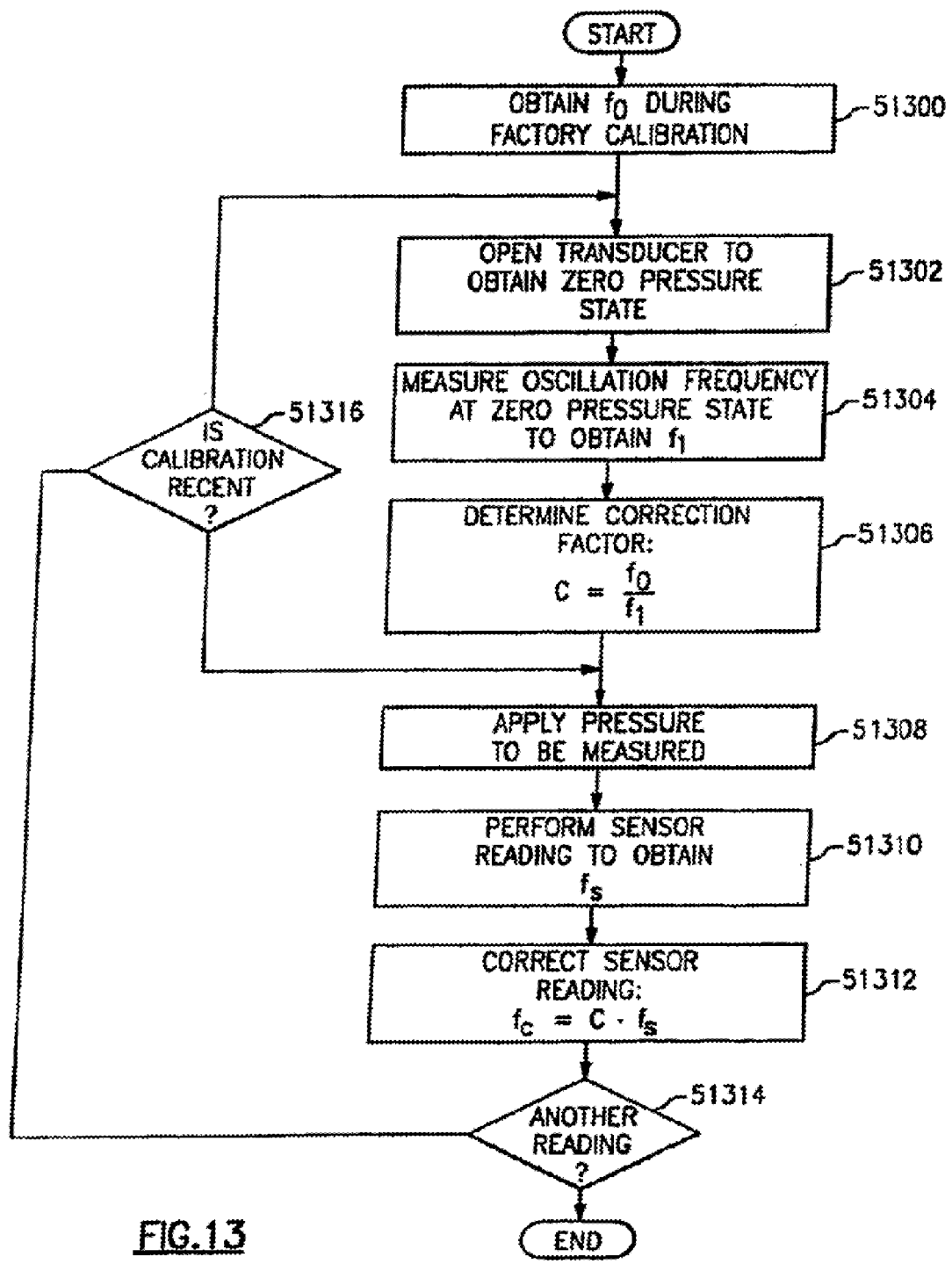

As embodied herein and depicted in FIG. 13, a flow chart showing a gain correction method for calibrating capacitive pressure sensor 10 is disclosed. In step 51300, a factory calibration zero pressure frequency $f_0$ is obtained. The frequency of sensor oscillator 50 is read when transducer 100 is operating under zero-pressure conditions. This value is stored in PROM in processor 74 and is used in all subsequent field calibration calculations. In step 51302, the transducer valve is opened to obtain the zero-pressure state in the ambient environment. In step 51304, the oscillation frequency is measured in the zero pressure state to obtain the field zero pressure frequency $f_1$. Processor 74 retrieves $f_0$ from memory and calculates the correction factor $C=f_0/f_1$, step 51306. Subsequently, sensor 10 is ready for use. When taking a measurement, sensor 10 will obtain a frequency value $f_S$ for some pressure value other than zero, step 51310. Before displaying or recording the pressure measurement, processor 74 corrects the measurement by applying the correction factor C, whereby: $f_{contact}=(C)*(f_S)$, step 51312. If another measurement is taken, step 51314, the calibration routine is performed again if the calibration is not recent, step 51316, and calibration is completed automatically in a fraction of a second. If the calibration is recent, step 51316, the operational flow jumps to step 51308. Thus, sensor 10 is calibrated as needed to conform to the ambient environmental conditions.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

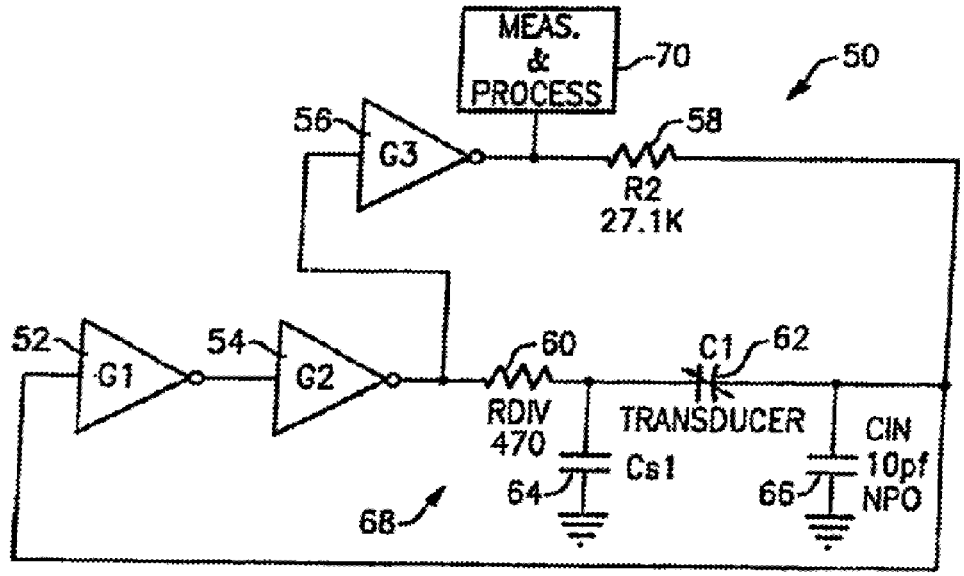

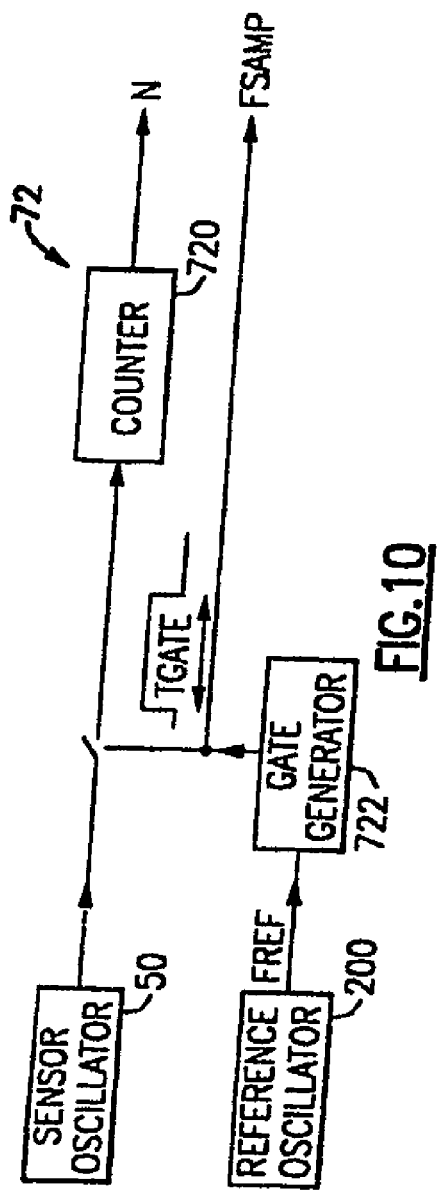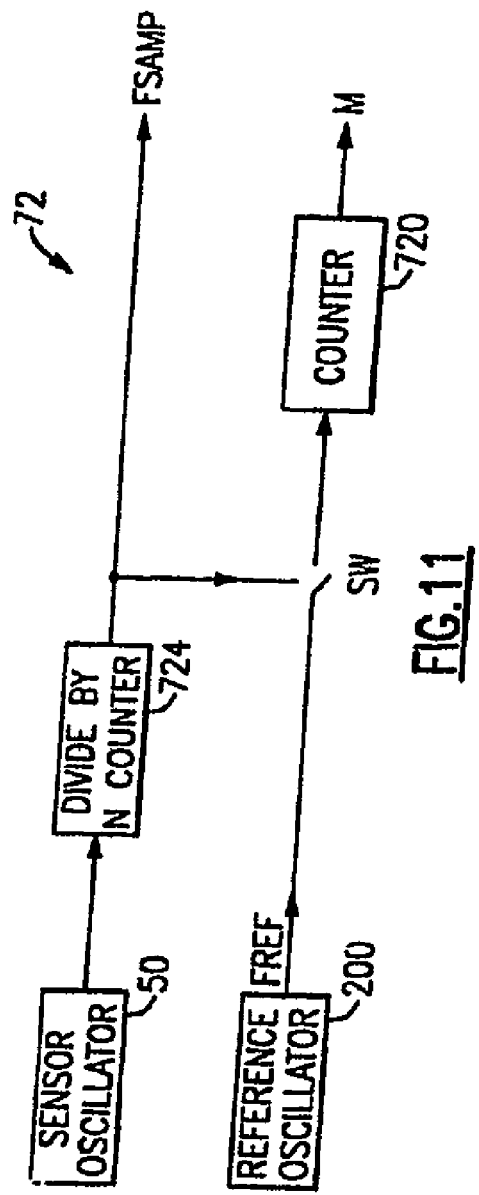

I claim:

1. An improved two loop capacitive sensor oscillator circuit to convert a transducer capacitance to frequency comprising:

a first loop to create an oscillatory waveform having a frequency related to a capacitance of the capacitive transducer, the first loop including a resistor having a resistor first connection and a resistor second connection, the resistor second connection electrically coupled to a capacitor (Cs1), having a capacitor (Cs1) first connection and a capacitor (Cs1) second connection, the resistor second connection electrically coupled to the capacitor (Cs1) first connection and the capacitor (Cs1) second connection electrically coupled to an electrical common, the resistor second connection also electrically coupled to the capacitive transducer, the capacitive transducer having a capacitive transducer first connection and a capacitive transducer second connection, the resistor second connection electrically coupled to the capacitive transducer first connection, the capacitive transducer second connection electrically coupled to an input of a first inverter gate also having a first inverter gate output, the first inverter gate output electrically coupled to a second inverter gate input, the second inverter gate also having a second inverter gate output, and the second inverter gate output electrically coupled to the resistor first connection, closing the first loop, the first and second inverter gates powered by a source of power (Vcc); and a second loop oscillating at the frequency of the first loop and to further generate a second waveform of a substantially square wave shape having the same frequency, the second loop electrically coupled to the first loop, the second loop including an input to the second loop being the input of a third inverter gate also having a third inverter gate output, the third inverter gate input electrically coupled to the second inverter gate output, the third inverter gate output electrically coupled to a second loop resistor first connection, the second loop resistor also having a second loop resistor second connection, the second loop resistor second connection electrically coupled to the input of the first inverter gate, closing the second loop, the third inverter gate also powered by the source of power (Vcc), wherein the second loop is electrically coupled to the first loop and the output of the third inverter gate is the substantially square wave at the frequency related to the capacitance of the capacitive transducer.

2. The capacitive sensor oscillator circuit of claim 1 wherein the capacitor (Cs1) comprises only a stray circuit capacitance and a combination of the resistor in the first loop and the capacitor (Cs1) forms a low pass RC filter that limits the voltage of the oscillatory waveform at the input to the first inverter gate.

3. The capacitive sensor oscillator circuit of claim 2 wherein the capacitive transducer has a mechanical structure and the stray capacitance includes the capacitance of the mechanical structure and the capacitive transducer first connection.

4. The capacitive sensor oscillator circuit of claim 3 wherein the stray capacitance of the mechanical structure includes a ring conductor capacitance and a guard ring capacitance.

5. The capacitive sensor oscillator circuit of claim 1 wherein the capacitor (Cs1) comprises a discrete capacitor and the combination of the resistor in the first loop and the discrete capacitor (Cs1) forms a low pass RC filter that limits the voltage of the oscillatory waveform at the input to the first inverter gate.

6. The capacitive sensor oscillator circuit of claim 1 further comprising a capacitor (CIN) having a capacitor (CIR) first connection and a capacitor (CIN) second connection, the capacitor (CIN) first connection electrically coupled to the input of the first inverter gate, the capacitor (CIN) second connection electrically coupled to the electrical common to limit the voltage of the oscillatory waveform applied to the input of the first inverter gate.

7. The capacitive sensor oscillator circuit of claim 6 wherein the capacitive transducer has a mechanical and an electrical structure including a metallic diaphragm, a metallic layer, and the transducer first and second connections, and capacitor (CIN) comprises the stray capacitance of the mechanical and the electrical structure of the transducer.

8. The capacitive sensor oscillator circuit of claim 6 wherein capacitor (CIN) further comprises an input capacitance of the first inverter gate.

9. The capacitive sensor oscillator circuit of claim 6 wherein capacitor (CIN) includes a discrete capacitor.

10. The capacitive sensor oscillator circuit of claim 9 wherein the discrete capacitor is of an NPO grade.

11. The capacitive sensor oscillator circuit of claim 1 wherein the first inverter gate is replaced by an analog comparator.

12. The capacitive sensor oscillator circuit of claim 1 wherein the first inverter gate and the second inverter gate are replaced by a single non-inverting gate.

13. The capacitive sensor oscillator circuit of claim 1 wherein the resistor coupled to the output of the second inverter gate is contained within the second inverter gate.

14. The capacitive sensor oscillator circuit of claim 1 wherein the resistor coupled to the output of the second inverter gate is the output resistance of the second inverter gate.

15. The capacitive sensor oscillator circuit of claim 1 wherein the resistor coupled to the output of the second inverter gate is a discrete resistor.

16. The capacitive sensor oscillator circuit of claim 1 further including a divider resistor having a divider resistor first connection and a divider resistor second connection, the divider resistor first connection electrically coupled to the resistor second connection of the resistor coupled to the output of the second inverter gate, the divider resistor second connection electrically coupled to the electrical common, wherein the divider resistor acts with the resistor to form a voltage divider to limit the voltage of the oscillatory waveform applied to the input of the first inverter gate.

17. The capacitive sensor oscillator circuit of claim 1 wherein the third inverter gate is supplemented by a fourth inverter gate electrically connected in parallel with the third inverter gate to reduce errors caused by changes in the output resistance of the third inverter gate.

18. An improved two loop capacitive sensor oscillator circuit to convert a transducer capacitance to frequency comprising:

a first loop means for creating an oscillatory waveform having a frequency related to a capacitance of the capacitive transducer, the first loop means including a resistor having a resistor first connection and a resistor second connection, the resistor second connection electrically coupled to a capacitor (Cs1), having a capacitor (Cs1) first connection and a capacitor (Cs1) second connection, the resistor second connection electrically coupled to the capacitor (Cs1) first connection and the capacitor (Cs1) second connection electrically coupled to an electrical common, the resistor second connection also electrically coupled to the capacitive transducer, the capacitive transducer having a capacitive transducer first connection and a capacitive transducer second connection, the resistor second connection electrically coupled to the capacitive transducer first connection, the capacitive transducer second connection electrically coupled to an input of a first inverter gate also having a first inverter gate output, the first inverter gate output electrically coupled to a second inverter gate input, the second inverter gate also having a second inverter gate output, and the second inverter gate output electrically coupled to the resistor first connection, closing the first loop means, the first and second inverter gates powered by a source of power (Vcc); and a second loop means for generating a second waveform of a substantially square wave shape having the same frequency and oscillating at the frequency of the first loop means, the second loop means electrically coupled to the first loop means, the second loop means including an input to the second loop means being the input of a third inverter gate also having a third inverter gate output, the third inverter gate input electrically coupled to the second inverter gate output, the third inverter gate output electrically coupled to a second loop resistor first connection, the second loop resistor also having a second loop resistor second connection, the second loop resistor second connection electrically coupled to the input of the first inverter gate, closing the second loop means, the third inverter gate also powered by the source of power (Vcc), wherein the second loop means is electrically coupled to the first loop means and the output of the third inverter gate is the substantially square wave at the frequency related to the capacitance of the capacitive transducer.

19. The capacitive sensor oscillator circuit of claim 18 wherein the capacitor (Cs1) of the first loop means comprises only a stray circuit capacitance and a combination of the resistor in the first loop means and the capacitor (Cs1) forms a low pass RC filter that limits the voltage of the oscillatory waveform at the input to the first inverter gate.

20. The capacitive sensor oscillator circuit of claim 19 wherein the RC filter further reduces radio frequency (RF) interference.

21. The capacitive sensor oscillator circuit of claim 19 wherein the capacitive transducer has a mechanical structure and the stray capacitance of the first loop means includes the capacitance of the mechanical structure and the capacitive transducer first connection.

22. The capacitive sensor oscillator circuit of claim 21 wherein the stray capacitance of the mechanical structure includes a ring conductor capacitance and a guard ring capacitance.

23. The capacitive sensor oscillator circuit of claim 18 wherein the capacitor (Cs1) comprises a discrete capacitor and the combination of the resistor in the first loop means and the discrete capacitor (Cs1) forms a low pass RC filter that limits the voltage of the oscillatory waveform at the input to the first inverter gate.

24. The capacitive sensor oscillator circuit of claim 18 further comprising a capacitor (CIN) having a capacitor (CIN) first connection and a capacitor (CIN) second connection, the capacitor (CIN) first connection electrically coupled to the input of the first inverter gate, the capacitor (CIN) second connection electrically coupled to the electrical common, wherein the capacitor (CIN) contributes to an RC filter acting with the resistor coupled to the output of the second inverter gate and the capacitor (CIN) further creates a voltage divider acting with the capacitance of the capacitive transducer to limit the voltage of the oscillatory waveform applied to the input of the first inverter gate.

25. The capacitive sensor oscillator circuit of claim 24 wherein capacitor (CIN) comprises a combination of a connection conductor stray capacitance and an input capacitance of the first inverter gate.

26. The capacitive sensor oscillator circuit of claim 24 wherein capacitor (CIN) includes a discrete capacitor.

27. The capacitive sensor oscillator circuit of claim 26 wherein the discrete capacitor is of an NPO grade.

28. The capacitive sensor oscillator circuit of claim 18 wherein the first inverter gate is replaced by an analog comparator.

29. The capacitive sensor oscillator circuit of claim 18 wherein the first inverter gate and the second inverter gate are replaced by a single non-inverting gate.

30. The capacitive sensor oscillator circuit of claim 18 wherein the resistor coupled to the output of the second inverter gate in the first loop means is contained within the second inverter gate.

31. The capacitive sensor oscillator circuit of claim 18 wherein the resistor coupled to the output of the second inverter gate in the first loop means is the output resistance of the second inverter gate.

32. The capacitive sensor oscillator circuit of claim 18 wherein the resistor coupled to the output of the second inverter gate in the first loop means is a discrete resistor.

33. The capacitive sensor oscillator circuit of claim 18 further including a divider resistor in the first loop means having a divider resistor first connection and a divider resistor second connection, the divider resistor first connection electrically coupled to the resistor second connection of the resistor coupled to the output of the second inverter gate, the divider resistor second connection electrically coupled to the electrical common, wherein the divider resistor acts with the resistor to form a voltage divider to limit the voltage of the oscillatory waveform applied to the input of the first inverter gate.

34. The capacitive sensor oscillator circuit of claim 18 wherein the third inverter gate in the second loop means is supplemented by a fourth inverter gate electrically connected in parallel with the third inverter gate to reduce errors caused by changes in the output resistor of the third inverter gate.

35. An improved two loop capacitive sensor oscillator circuit to convert a transducer capacitance to frequency comprising:

an oscillator having two loops including a first loop to create a saw tooth waveform having a frequency inversely proportional to a capacitance value of the capacitive transducer, and a second loop electrically coupled to the first loop, the first loop including a resistor and a capacitance to form an RC low pass filter to reduce RF interference and to limit the voltage of the waveform as applied to an input of a gate in the first loop and the capacitive transducer, the second loop comprising a gate and a resistor, wherein both the gate and the resistor of the second loop are coupled to the first loop, the input of the gate in the second loop connected to an output of the gate in the first loop and the resistor of the second loop connected to the input of the gate in the first loop, the second loop further providing a substantially squared output waveform at the oscillator frequency at the output of a gate in the second loop, the gates of both the first loop and the second loop powered by a source of power (Vcc) referenced to an electrical common, wherein the low pass filtered saw tooth waveform has a maximum voltage and a minimum voltage and the minimum voltage is greater than or equal to electrical common and the maximum voltage is less than or equal to Vcc.

36. The improved two loop oscillator circuit of claim 35 wherein the gate in the first loop comprises a non-inverting gate or two inverting gates connected in series to form a non-inverting gate.

37. The improved two loop oscillator circuit of claim 35 wherein the capacitance of the RC filter is provided by stray circuit capacitance or by the combination of stray circuit capacitance and at least one discrete capacitor.

38. The improved two loop oscillator circuit of claim 35 further comprising a capacitive divider comprising the capacitive transducer and a second capacitance in the first loop wherein the resulting capacitive divider limits the voltage range of the saw tooth waveform at the input of the gate in the first loop to less than a range of Vcc to common.

39. The improved two loop oscillator circuit of claim 35 further comprising a resistive divider comprising the resistor of the first loop and a second resistor in the first loop wherein the resulting resistive divider limits the voltage range of the saw tooth waveform at the input of the gate in the first loop is limited to less than a range of Vcc to common.

40. The improved two loop oscillator circuit of claim 35 wherein one or more of the gates comprise two or more gates in parallel to mitigate errors caused by gate output resistance.

* * * * *

UNITED STATES PATENT AND TRADEMARK OFFICE
CERTIFICATE OF CORRECTION

PATENT NO. : 7,119,551 B2
APPLICATION NO. : 11/250348
DATED : October 10, 2006
INVENTOR(S) : Burdick It is certified that error appears in the above-identified patent and that said Letters Patent is hereby corrected as shown below:

The title page showing the illustrative figure should be deleted and substitute with the attached title page.

The drawing sheet, consisting of Fig. 1-13, should be deleted and replaced with drawing sheet, consisting of Fig. 1-13, as shown on the attached page.

Column 13, Claim 6, Line 59, "(CIR)" should be -- (CIN) --.

Signed and Sealed this

Twenty-seventh Day of February, 2007

JON W. DUDAS
*Director of the United States Patent and Trademark Office*

(12) United States Patent
Burdick

(10) Patent No.: US 7,119,551 B2
(45) Date of Patent: Oct. 10, 2006

(54) CAPACITIVE SENSOR

(75) Inventor: Kenneth J. Burdick, Skaneateles, NY (US)

(73) Assignee: Welch Allyn, Inc., Skaneateles Falls, NY (US)

(*) Notice: Subject to any disclaimer, the term of this patent is extended or adjusted under 35 U.S.C. 154(b) by 0 days.

(21) Appl. No.: 11/250,348

(22) Filed: Oct. 14, 2005

(65) Prior Publication Data
US 2006/0049835 A1    Mar. 9, 2006

Related U.S. Application Data

(63) Continuation of application No. 11/005,731, filed on Dec. 6, 2004, now Pat. No. 6,992,492, which is a continuation of application No. 10/058,191, filed on Oct. 26, 2001, now Pat. No. 6,828,801.

(51) Int. Cl.
G01R 27/26 (2006.01)
H03B 5/08 (2006.01)

(52) U.S. Cl. .............. 324/658; 324/681; 331/36 C; 333/65

(58) Field of Classification Search ............ 324/658
See application file for complete search history.

(56) References Cited

U.S. PATENT DOCUMENTS

| | | | |
|---|---|---|---|
| 4,679,032 A * | 7/1987 | Roschier | 340/562 |
| 4,806,783 A * | 2/1989 | Anderson | 73/724 |
| 4,920,322 A * | 4/1990 | Ruijs | 331/17 |
| 4,987,389 A * | 1/1991 | Brosh et al. | 331/65 |
| 5,136,262 A * | 8/1992 | Spencer | 324/681 |
| 5,929,677 A * | 7/1999 | Murata | 331/17 |

* cited by examiner

Primary Examiner—Vincent Q. Nguyen
Assistant Examiner—Timothy J. Dole
(74) Attorney, Agent, or Firm—Wall Marjama & Bilinski LLP

(57) ABSTRACT

An improved two loop capacitive sensor oscillator circuit converts a transducer capacitance to a frequency and includes a first loop to create an oscillatory waveform having a frequency related to a capacitance of the capacitive transducer. The first loop includes a resistor. The resistor is electrically coupled to a capacitor. The resistor is also electrically coupled to the capacitive transducer. The capacitive transducer is electrically coupled to an input of a first inverter gate. A second loop oscillates at the frequency of the first loop and further generates a second waveform of a substantially square wave shape at the same frequency. The second loop is electrically coupled to the first loop and the output of a third inverter gate is substantially a square wave at the frequency related to the capacitance of the capacitive transducer.

40 Claims, 7 Drawing Sheets